US009506545B2

(12) United States Patent
Klovstad

(10) Patent No.: US 9,506,545 B2
(45) Date of Patent: Nov. 29, 2016

(54) CONTINUOUSLY VARIABLE TRANSMISSION HAVING A PERIODIC DISPLACEMENT WAVEFORM WITH A CONSTANT VELOCITY PORTION

(71) Applicant: John William Klovstad, Whitefish, MT (US)

(72) Inventor: John William Klovstad, Whitefish, MT (US)

(73) Assignees: John W. Klovstadt, Whitefish, MT (US); GOLDEN PRODUCTS AND SERVICES LLC, Sterling Heights, MI (US)

( * ) Notice: Subject to any disclaimer, the term of this patent is extended or adjusted under 35 U.S.C. 154(b) by 349 days.

(21) Appl. No.: 13/844,697

(22) Filed: Mar. 15, 2013

(65) Prior Publication Data
US 2014/0260717 A1    Sep. 18, 2014

(51) Int. Cl.
| F16H 19/04 | (2006.01) |
| F16H 29/20 | (2006.01) |
| F16H 29/04 | (2006.01) |

(52) U.S. Cl.
CPC .............. *F16H 29/20* (2013.01); *F16H 29/04* (2013.01); *Y10T 74/18096* (2015.01); *Y10T 74/18296* (2015.01)

(58) Field of Classification Search
CPC .................................................. F16H 19/043
See application file for complete search history.

(56) References Cited

U.S. PATENT DOCUMENTS

| 3,327,544 | A * | 6/1967 | Colinet .......................... 74/125 |
| 3,646,822 | A | 3/1972 | Pocaterra |
| 4,576,068 | A | 3/1986 | Glatthorn |
| 4,984,607 | A | 1/1991 | Beyaert |
| 5,603,240 | A | 2/1997 | Klovstad et al. |
| 6,364,275 | B1 | 4/2002 | Lindsay |
| 7,416,506 | B2 | 8/2008 | Naude |
| 7,506,668 | B2 | 3/2009 | Vanderjeugt et al. |
| 7,748,291 | B2 | 7/2010 | Pages et al. |
| 2006/0199694 | A1 | 9/2006 | Roberts |
| 2007/0140871 | A1 | 6/2007 | Bond |
| 2008/0296011 | A1 | 12/2008 | Hult |
| 2010/0294054 | A1 | 11/2010 | Flugrad et al. |
| 2011/0253496 | A1 | 10/2011 | Shin et al. |

* cited by examiner

*Primary Examiner* — Terence Boes
(74) *Attorney, Agent, or Firm* — Helmholdt Law PLC; Thomas D. Helmholdt

(57) ABSTRACT

A continuously variable transmission (CVT) can include a rotary cam member defining an internal cam surface operably engaged with a cam follower assembly for generating a displacement waveform with a constant velocity portion. A ratio control assembly can restrain the cam follower assembly for reciprocal linear movement and can scale the reciprocal linear movement between at least 0% and 100%, inclusive, in response to an angular orientation of the ratio control assembly. An output assembly can convert the scaled reciprocal linear movement into rotary movement of an output shaft. A CVT method can include generating a periodic displacement waveform with a constant velocity portion, scaling the periodic displacement waveform between at least 0% and 100%, inclusive, with a ratio plate, where the scaling is in response to an angular orientation of the ratio plate, and converting the reciprocal linear movement into rotary output with a combiner.

15 Claims, 16 Drawing Sheets

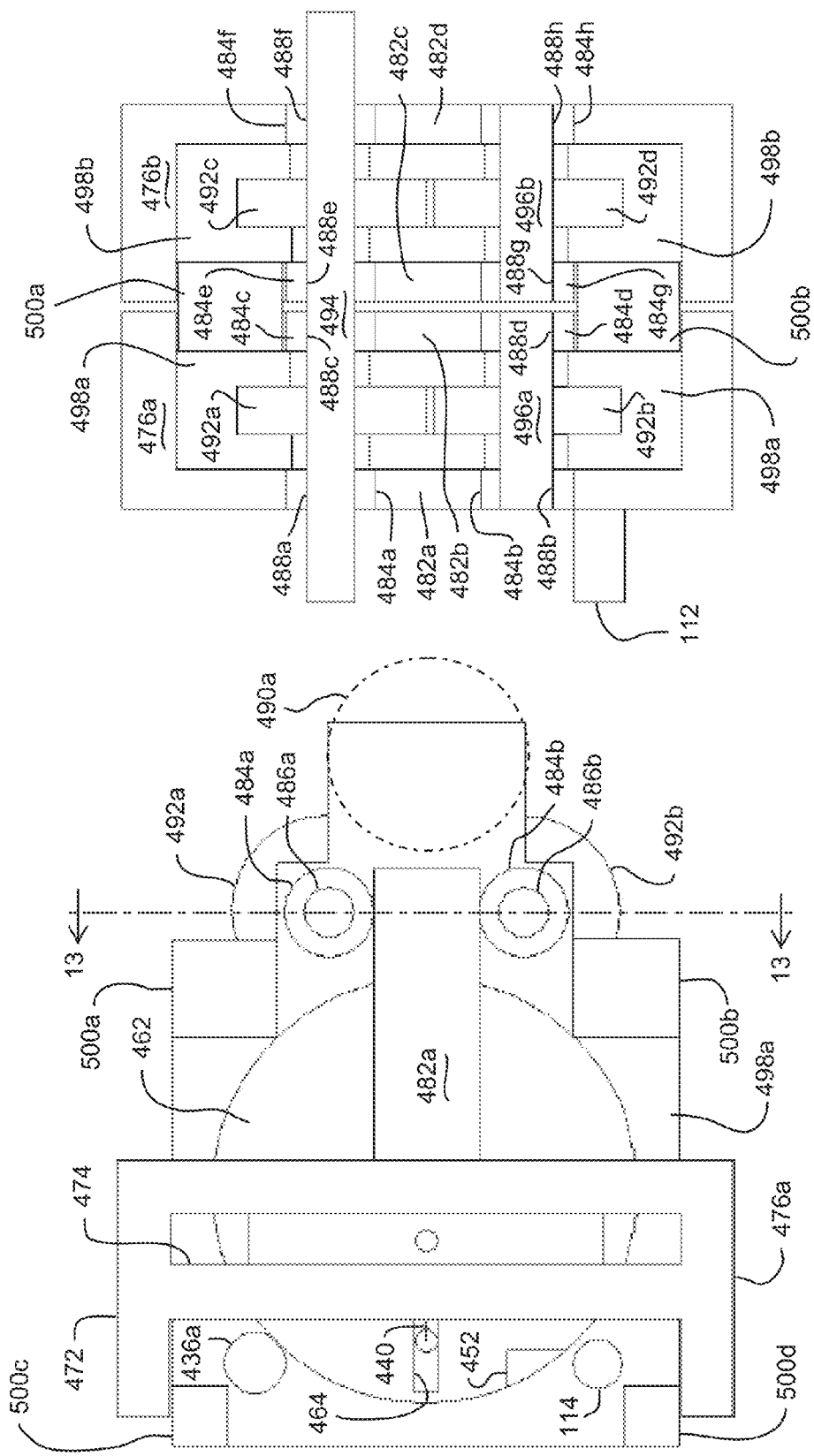

CONTINUOUSLY VARIABLE TRANSMISSION HAVING A PERIODIC DISPLACEMENT WAVEFORM WITH A CONSTANT VELOCITY PORTION

FIELD OF THE INVENTION

The invention relates to mechanical devices constituting portions of machines having two or more fixed and movable parts so combined that the motion of one compels a completely controlled or constrained motion of the other according to a law of operation inherent in and depending on the nature of the combination, where the mechanism has a rotary cam driving member and is provided with parts adapted to impart step-by-step motion to a unidirectionally driven member, in which the extent of movement of the transmitting parts may be varied, and more particularly, a rotatable machine element having a surface or a groove formed therein of predetermined contour which will impart a prescribed motion of reciprocation or oscillation to a follower slidably contacting with such surface or groove and an element adapted to slidably contact with and to be moved by a cam.

BACKGROUND

Various configurations for a continuously variable transmission (CVT) have been proposed: see for example, U.S. Pat. Nos. 7,506,668; 7,416,506; 6,364,275; 5,603,240; U.S. Published Application No. 2011/0253496; European Patent No. 1,735,547; European Patent No. 1,413,387; and French Patent No. 996,723. While each of these devices appears suitable for its intended purpose, continuously variable transmissions have not gained wide spread acceptance in industry. Different theories can be advanced to explain the lack of wide spread acceptance in the industry including the level of complexity of the mechanical systems required, difficulty in manufacturing, assembly and/or servicing parts, and negative evaluations from various cost benefit analysis systems.

It would be desirable to provide a continuously variable transmission that reduced the complexity of the mechanical system required to obtain usable rotary output from at least one traditional rotary prime mover input, such as an internal combustion engine, powered by gasoline or diesel fuel, and/or an electric motor/generator powered device. It would be desirable to provide a continuously variable transmission that reduced the difficulty in manufacturing, assembly, and/or servicing of parts required for the continuously variable transmission. It would be desirable to provide a continuously variable transmission that obtained a favorable result from cost benefit analysis. It would be desirable to provide a continuously variable transmission in electric motor applications having the ability to regenerate power from the wheels back to the prime mover.

SUMMARY

A continuously variable transmission can be provided for generating continuously variable partial rotary output or continuously variable constant rotary output in response to a rotary power input. The transmission can operate based on any combination of a cam and a cam follower. In particular, the cam can be rotatable in response to the rotary power input. The cam can be coupled with a ratio control assembly that can restrain movement of the cam follower in operable engagement with the cam to reciprocal linear movement. The rotatable ratio control assembly can scale the reciprocal linear movement of the cam follower to between at least 0% and 100%, inclusive, in response to an angular orientation of the ratio control assembly. The rotatable ratio control assembly can be coupled to an output assembly. The output assembly can convert the scaled reciprocal linear movement into at least intermittent, continuously variable, constant velocity, rotary output.

In a dual module configuration, the continuously variable transmission couples the output shaft of prime mover to at least two displacement waveform generators (DWGs). The DWGs in a preferred embodiment each comprise a rotary cam member operably engaged with an associated cam follower assembly for generating a displacement waveform with a constant velocity portion. The displacement waveforms of each cam follower are offset in phase with respect to one another. Two linear displacement multipliers (LDMs) are in cooperation with the two DWGs. In the preferred embodiment, the LDMs comprise two ratio control members, one associated to each cam member. Each ratio control member restrains an associated cam follower assembly for reciprocal linear movement. Each ratio control member is adjustable about an axis of rotation for scaling the reciprocal linear movement in response to angular orientation of the ratio control member. At least two combiners, one associated to each DWG, converts the scaled reciprocal linear movement into a rotary output. In the preferred embodiment the at least two combiners are a rack and pinion.

A method for providing a continuously variable transmission between a rotatable input shaft and a rotatable output shaft can include generating a periodic displacement waveform with a constant velocity portion, scaling the periodic displacement waveform between 0% and 100% inclusive with a ratio plate, the scale of the periodic displacement waveform being in response to an angular orientation of the ratio plate, and converting the reciprocal linear movement into rotary output with a combiner According to above described embodiments, a continuously variable transmission can be provided that reduces the complexity of the mechanical system required to obtain usable rotary output from at least one traditional rotary prime mover input, such as an internal combustion engine, powered by gasoline or diesel fuel, and/or an electric motor/generator powered device, reduces the difficulty in manufacturing, assembly, and/or servicing of parts required for the continuously variable transmission, obtains a favorable result from cost benefit analysis, and/or regenerates power from the wheels back to the prime mover, such as an electric motor/generator for recharging a battery or other energy recapture device.

Other applications of the present invention will become apparent to those skilled in the art when the following description of possible modes contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 12 is a compact single module CVT; and

FIG. 13 is a cross sectional view of the compact single module CVT taken as shown in FIG. 12.

DETAILED DESCRIPTION

Figure 1:
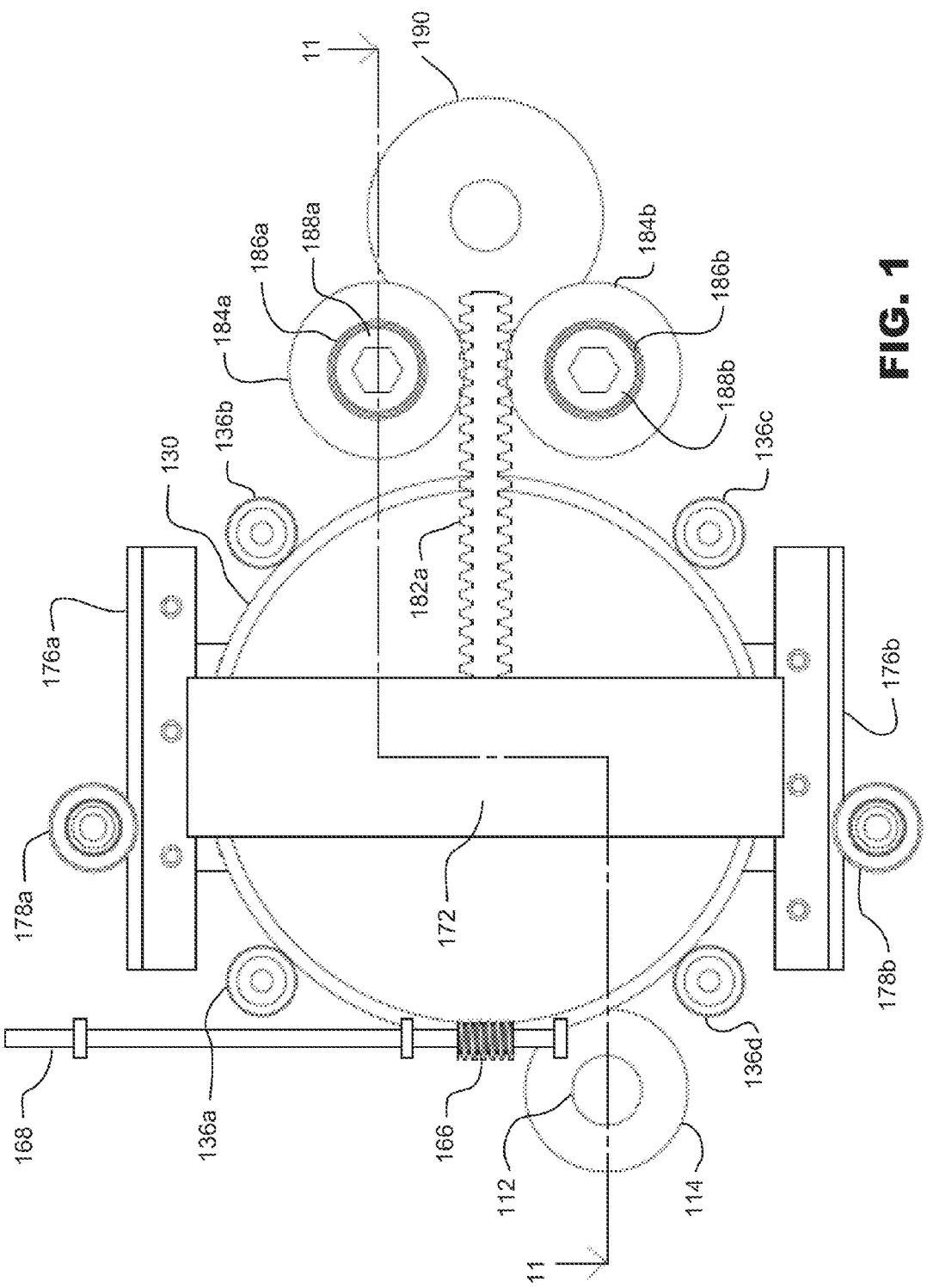
FIG. 1 is a side view of a single module of a continuously variable transmission (CVT)

The CVT of the present invention includes three main elements, a displacement waveform generator (DWG), a linear displacement multiplier (LDM), and a displacement waveform combiner (DWC), which can be assembled as a single modular unit, or combined into a plurality of modular units. Each modular unit can generate rotary output movement, in either rotary direction in response to a rotary power input, and selective sequential control of clutches connected to the output shaft of the continuously variable transmission.

Referring to FIGS. 1-8D, rotary power input is provided to a single module continuously variable transmission through an input shaft 112 and an input gear 114. The input gear 114 delivers rotary power input to a rotary cam assembly or member 130. The rotary cam assembly or member 130 can be rotated about a rotational axis in response to the rotation of the input gear 114. To simply the illustrations, the supporting structure for the continuously variable transmission has been eliminated from the FIGS. 1-8D of the drawings. The rotary cam assembly or member 130 can be configured in combination with a cam follower assembly 140 to change rotary movement into linear movement. The rotary cam assembly or member 130 can be supported for stable rotation by equi-angularly spaced rollers 136a, 136b, 136c, 136d operably engaging an external periphery of the rotary cam assembly or member 130.

Figure 3:
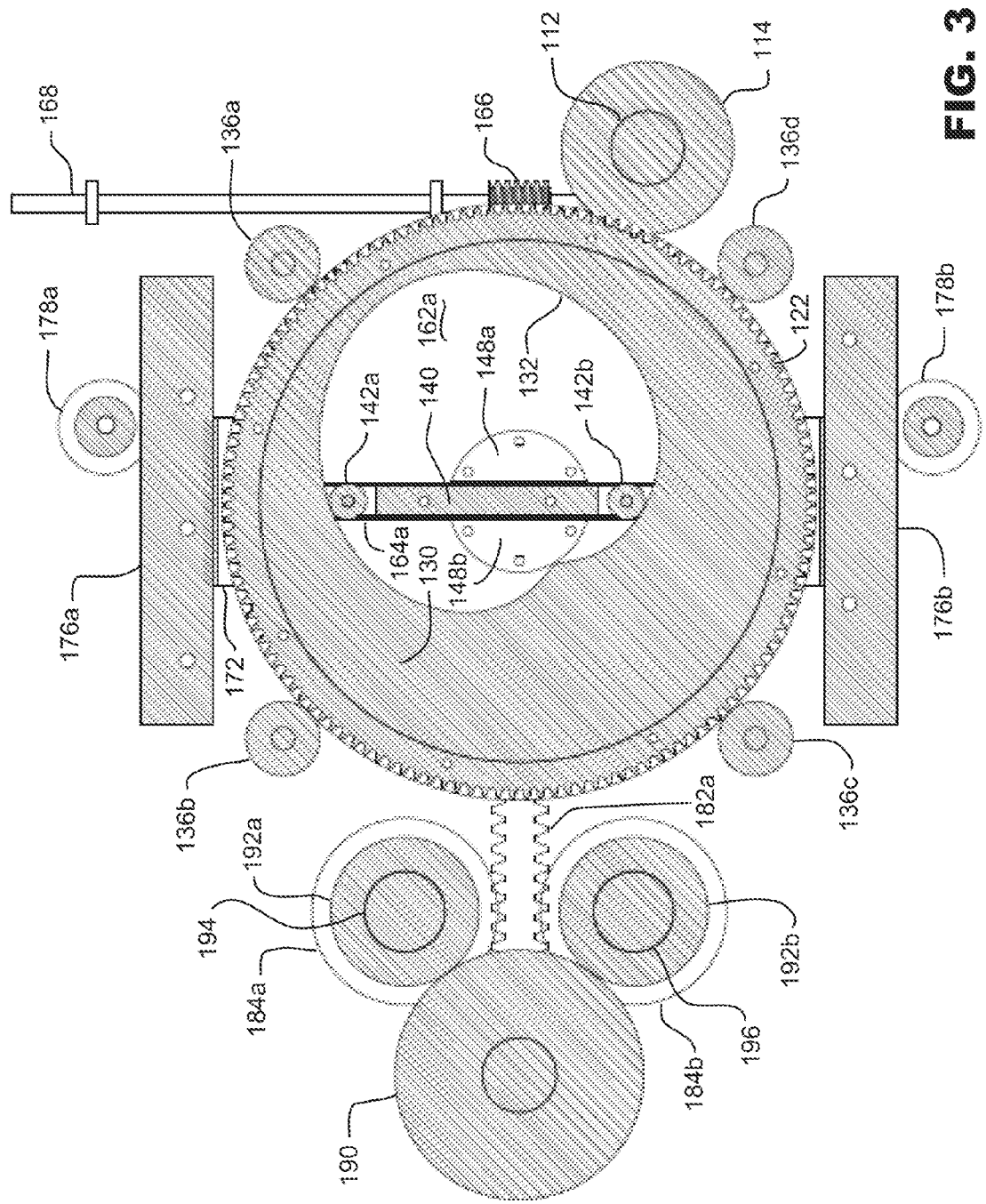
FIG. 3 is a cross sectional view of the CVT of FIGS. 1-2.
Figure 7:
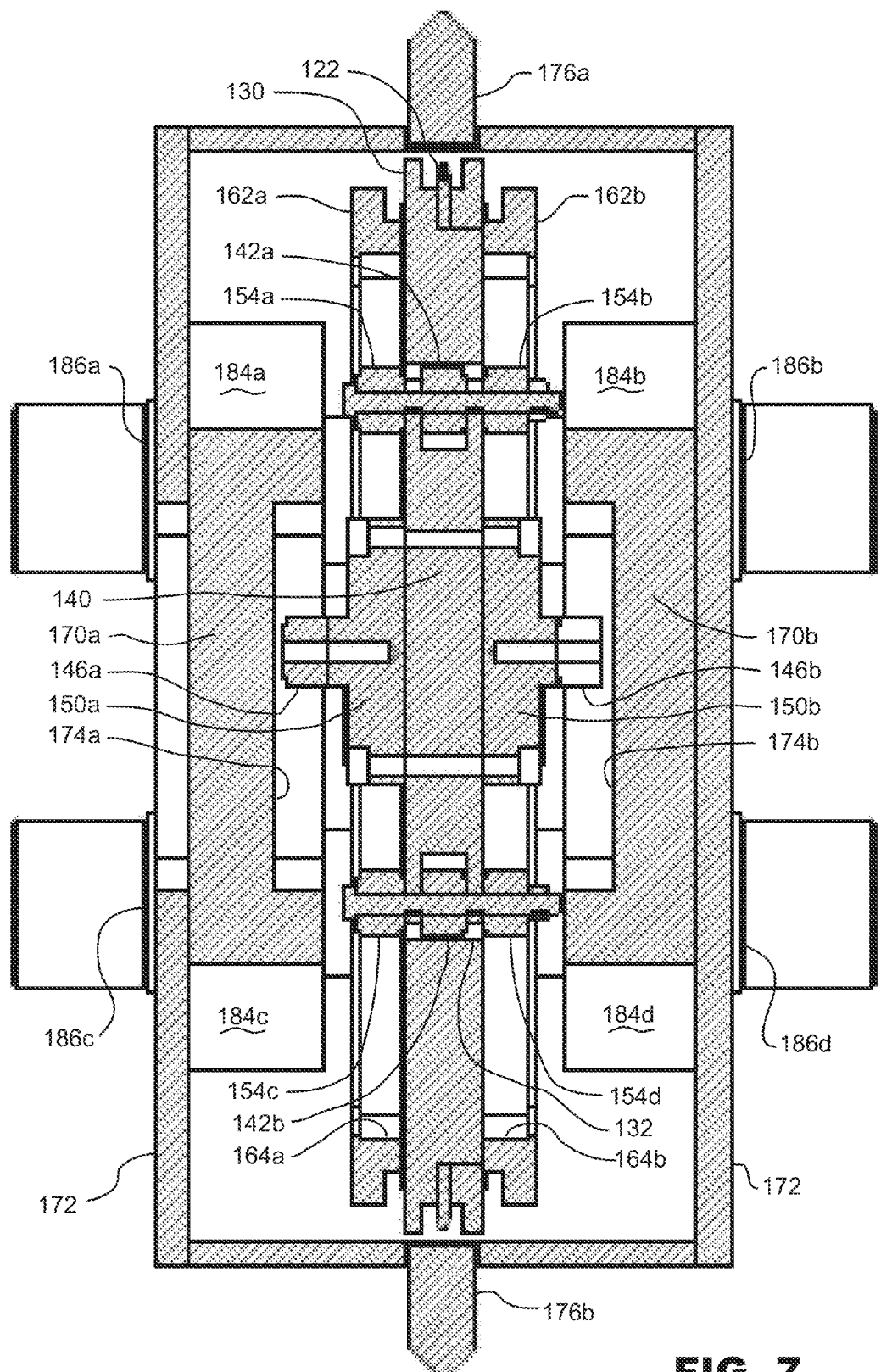
FIG. 7 is a cross sectional view of the CVT of FIGS. 1-6.

The continuously variable transmission can include at least one ratio control assembly including at least one ratio plate 162a, 162b configured to adjust an output ratio of the rotary cam assembly or member 130 in combination with a cam follower assembly 140. Dual ratio plates 162a, 162b can be located on opposite sides of the rotary cam assembly 130 and can be connected with respect to one another for synchronized rotation by connecting blocks 148a, 148b, as best seen in FIG. 3. Each ratio plate 162a, 162b can include a corresponding slot 164a, 164b for restraining movement of an operably engaged cam follower assembly 140 to reciprocal linear movement along a length of the slot 164a, 164b. The ratio plate 162a, 162b can be rotatable in response to rotary input through a worm gear shaft 168. The worm gear shaft 168 can be operated manually, or automatically, based on rotary input from an actuator of the continuously variable transmission. A worm gear 166 can be connected to the worm gear shaft 168 to operably rotate the ratio plate 162a, 162b in response to rotary input of the worm gear shaft 168. The ratio plate 162a, 162b can receive the output movement from the cam follower assembly 140 as the rotary cam assembly or member 130 rotates. Angular movement of the ratio plate 162a, 162b scales reciprocal linear output movement of the cam follower assembly 140 between at least 0% and 100% by converting the reciprocal linear movement into Cartesian coordinate force vectors, such that one Cartesian coordinate force vector can transfer movement into a slider 170a, 170b, while a perpendicular Cartesian coordinate force vector results in lost motion along a slot 174a, 174b formed in the slider 170a, 170b as best seen in FIG. 7.

The slide block 172 can be supported from first and second guide rails 176a, 176b for movement forward and backward. The first and second guide rails 176a, 176b can be supported from guide rollers 178a, 178b, respectively. According to the converted Cartesian coordinate force vector output of the cam follower assembly 140 controlled by the ratio plate 162a, 162b, the slide block 172 moves forward and backward. The slide block 172 can be coupled with at least one rack 182a, 182b to transfer the back and forth movement, i.e., reciprocal linear movement. The reciprocal linear movement of the rack 182a, 182b can be delivered into at least one pair of pinions 182a, 182b; 182c, 182d, such as first pinion 184a and second pinion 184b. The first pinion 184a can be rotated, when engaging with the first rack 182a, according to one of back and forth linear movements of the first rack 182a. Likewise, the second pinion 184b can be rotated according to the other of back and forth linear movements of the rack 182a. For example, when the rack 182a moves forward, the first pinion 184a is rotated counter-clockwise while the second pinion 184b rotates clockwise. When the rack 182a moves backward, the first pinion 184a is rotated clockwise while the second pinion 184b rotates counter-clockwise. These movements, i.e., torques of the first and second pinions 184b, are selectively delivered by a corresponding clutch 186a for the first pinion 184a and a corresponding second clutch 186b for the second pinion 184b.

By way of example and not limitation, to deliver power/movement, the first and second clutches 186a and 186b can be one-way clutches. The one-way clutch, e.g., 186a, is a functional component located between cylindrical inner, e.g., first spindle 194, and an outer ring, e.g., the pinion 184a, for transmitting or suspending torque, which transmits torque in one rotational direction while stopping torque transmission in the opposite direction. Rotational direction of the pinion 184a determines transmission and non-transmission of torque. For example, it is assumed that the first clutch 186a passes clockwise torque. When the pinion 184a turns clockwise, the first clutch 186a transmits the torque so that the first spindle 194 rotates clockwise. Otherwise, when the pinion 184a rotates counter-clockwise, the first clutch 186a transmits no torque so that the first spindle 194 is not driven by pinion 184a.

The first clutch 186a can be an operable two-way clutch 186a to selectively control the engagement between the first pinion 184a and output shaft 194, and the second clutch 186b can be an operable two-way clutch 186b to selectively control engagement between the second pinion 184b and the transfer shaft 196 via transmission through intermediate gears 192a, 192b connected to the output shaft 194 and transfer shaft 196 respectively by transfer gear 190. Transmission and non-transmission controlled by the first operable clutch 186a and the second operable clutch 186b make the transfer gear 190 rotate in a desired direction, e.g., clockwise or counter-clockwise. Selectively engaging with one of the first and second pinions 184a, 184b, allows the transfer gear 190 to be separated from the other of the first and second pinions 184a, 184b in order to rotate in a particular direction, e.g., clockwise or counter-clockwise. Here, the first and second clutches 186a, 186b are located between inner surfaces of the first and second pinions 184a, 184b and first and second spindles 194,196, through bearings 188a, 188b, respectively.

Figure 2:
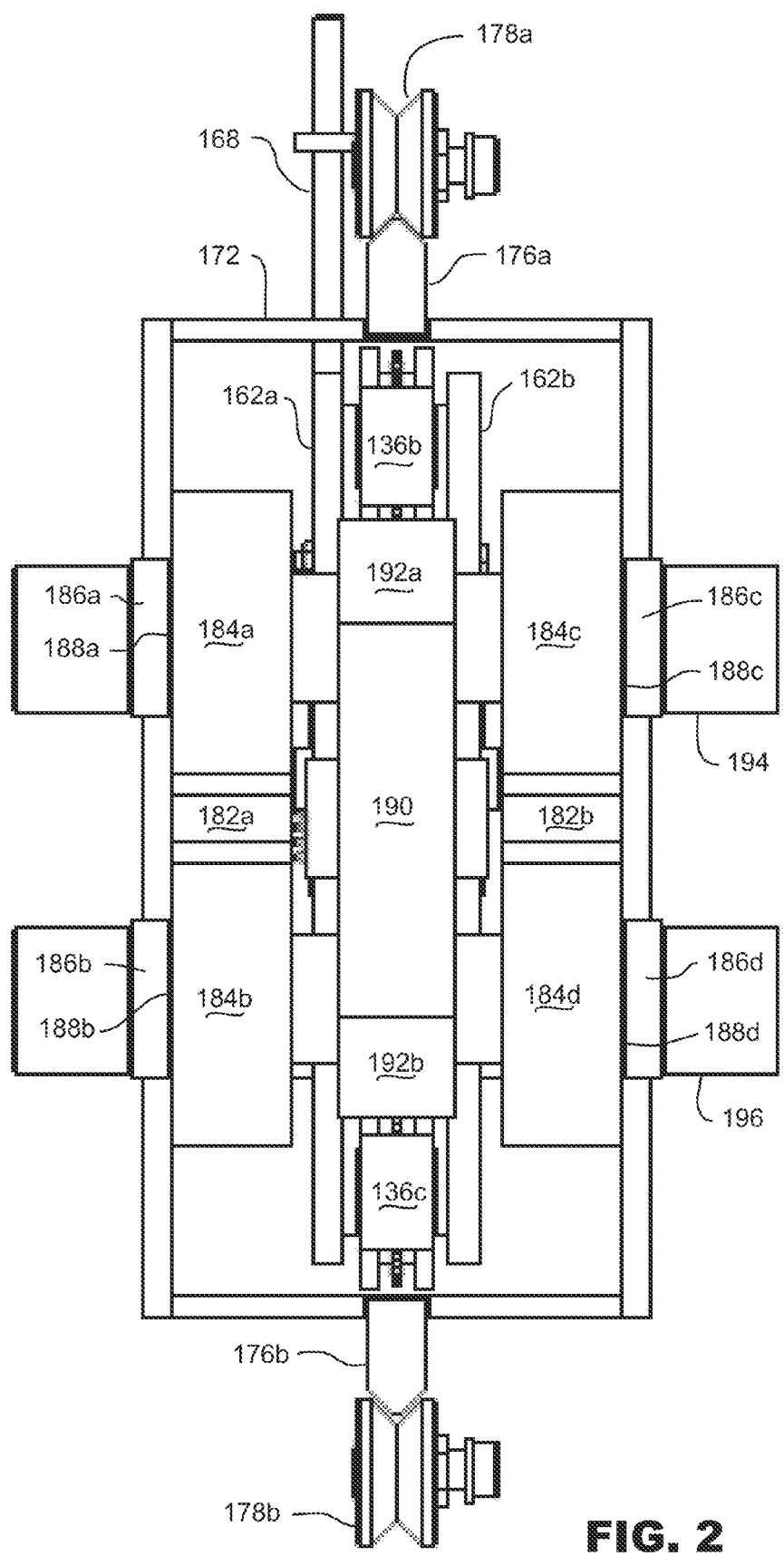
FIG. 2 is a front view of the CVT of FIG. 1.

Referring now to FIG. 2, two ratio plates 162a and 162b can be located with the cam member 130 interposed therebetween. The first and second ratio plates 162a, 162b can have the same structure. Output from the cam member 130 driving the cam follower assembly 140 can be delivered into a sliding assembly 172, including the first slider 170a and a second slider 170b, through the first and second ratio plates 162a and 162b, respectively. The two ratio plates 162a and 162b can deliver the same linear movements into two sliders 170a and 170b. The two sliders 170a and 170b are linked through the sliding assembly 172 structure to move in the same direction with the same speed so that the two sliders 170a and 170b are coupled to each other to constitute a unitary structure with the sliding assembly 172. The two ratio plates 162a, 162b can have an advantage of reducing an operational load of the transmission as compared with a configuration using a single ratio plate.

The sliding assembly 172 can be coupled with two racks 182a, 182b. Each of the racks 182a, 182b can be coupled with different pinions 184a, 184b, 184c, 184d. The first pinion 184a and the second pinion 184b are coupled to the first rack 182a, whereas the third and fourth pinions 182c, 182d are coupled to the second rack 182b. Further, the first and third pinions 184a, 184c are coupled with a first spindle or output spindle 194, while the second and fourth pinions 184b, 184d are coupled with a second spindle or transfer spindle 196. The first and second spindles 194, 196 are coupled with two intermediate gears 192a, 192b, respectively. The two intermediate gears 192a and 192b are coupled to the third gear or transfer gear 190.

While not shown, it should be recognized that the cam member 130 can be used to generate two different angularly offset waveform outputs, where the two ratio plates 162a, 162b can receive two different angular offset waveform outputs of the cam member 130, respectively. Since the two different angularly offset waveform outputs can have different direction and/or different magnitude, the two ratio plates, each engaged with two separate cam follower assemblies, also delivers different movements into two independently reciprocal sliders.

As shown in FIG. 2, when the first and second ratio plates 162a, 162b receive the same output from the cam member 130, the first and second ratio plates 162a, 162b can be rotated in synchronization with each other by a single worm gear shaft 168. Since the rotation of the first and second ratio plates 162a, 162b are synchronized with each other, two different worm gear shafts are not necessary. A worm gear 166 driven by the worm gear shaft 168 can rotate the first and second ratio plates 162a, 162b. The angular orientation of the first and second ratio plates 162a, 162b can determine an output ratio of the transmission as will be described in greater detail below.

Referring now to FIG. 3, the cam member 130 includes a cam surface 132 and a single cam follower assembly 140 moving along the cam surface 132. The cam member 130 also includes a sprocket 122 configured to rotate the cam member 130 according to power input delivered through an input gear 114.

The cam follower assembly 140 can include two cam followers 142a, 142b configured to move along the cam surface 132 and a rigid bar 144 configured to connect the two cam followers 142a, 142b. The cam surface 132 can have a heart-like shape. The shape of the cam surface 132 can determine displacement and velocity waveforms generated based on rotary movement of the cam member 130 and the resulting reciprocal linear movement of the cam follower assembly 140. The cam surface 132 can define a hollow region in the cam member 130, where the two cam followers 142a, 142b locate in operable engagement with opposite sides of the cam surface 132. The heart-type shape of the cam surface 132 is designed to generate a movement having a constant velocity in a partial portion of each cycle.

When the cam member 130 is rotated, the cam surface 132 also rotates. Though the two cam followers 142a, 142b of the cam follower assembly 140 can move along the cam surface 132, the movement of the cam follower assembly 140 is actually restricted by the ratio plates 162a, 162b. That is, the ratio plates 162a, 162b guide the movement of the cam follower assembly 140 in linear reciprocal direction by engagement of a portion 150a, 150b and rollers 154a, 154b, 154c, 154d of the cam follower assembly 140 operably engaging within slots 164a, 164b formed in the ratio plates 162a, 162b respectively as best seen in FIG. 7. Since the two cam followers 142a, 142b move along the cam surface 132 having a heart-shape, the linear reciprocal movement of the cam follower assembly 140 is manifested in a periodic and symmetric velocity waveform, including a constant portion and a linear change portion.

In a center area of the cam member 130, plate connectors 148a, 148b is configured to couple the two ratio plates 162a, 162b with respect to each other for synchronizing the movements of the two ratio plates 162a, 162b located on opposite sides of the cam member 130. The plate connectors 148a, 148b rotate with the ratio plates 162a, 162b so that the plate connectors 148a, 148b do not limit the reciprocal linear movement of the cam follower assembly 140 when driven by rotation of the cam member 130.

Figure 4:
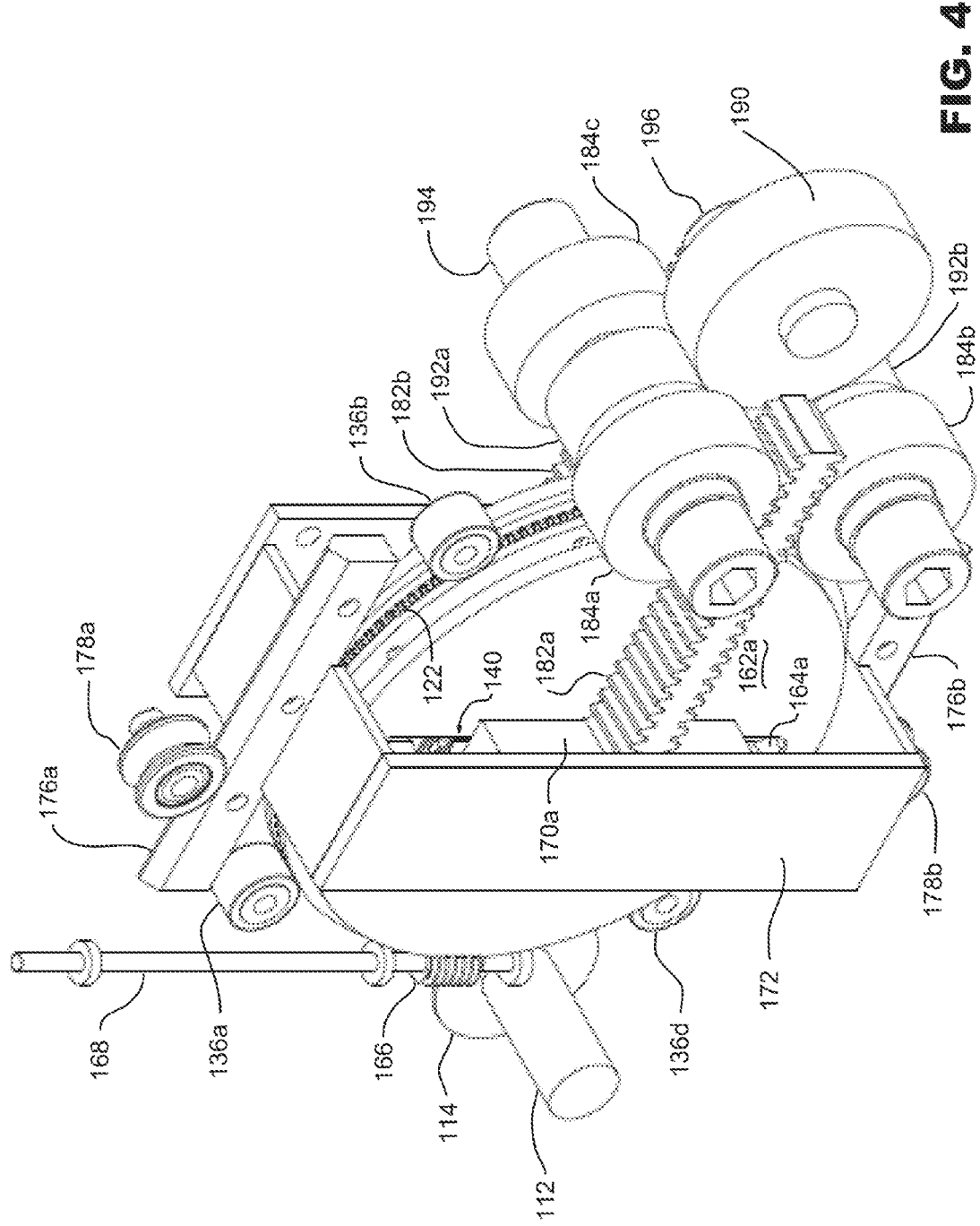
FIG. 4 is an isometric view of the CVT of FIGS. 1-3.

Referring now to FIG. 4, the slider 172a moves forward and backward in response to a linear reciprocal movement delivered through the ratio plates 162a by the cam follower assembly 140. The first slider 172a can be connected to a sliding block 170a in proximity with the first ratio plate 162a. The sliding assembly 172 including the first slider 172a can be supported by guide rails 176a, 176b for guiding the sliding assembly 172 in forward and backward movements, and the guide bars 176a, 176b can be supported by rollers 178a, 178b for enabling forward and backward movements of the guide bars 176a, 176b.

The first ratio plate 162a can include a slot 164a. Rotation of the first ratio plate 162a changes an angular orientation of the slot 164a as well as the angular orientation of the captured cam follower assembly 140. Therefore, the slot 164a in the first ratio plate 162a also determines the angular orientation of the cam follower assembly 140 with respect to the cam member 130. Accordingly, whenever the first ratio plate 162a rotates, the cam follower assembly 140 adjusts to a different angular orientation within the cam member 130. However, the slider 172a and the sliding block 170a, 170b are fixed, e.g., corresponding to an X-direction or a Y-direction of a Cartesian coordinate system. As the first ratio plate 162a rotates, an orientation angle in degrees is changed between the slot 164a of the first ratio plate 162a and an axis of linear movement of a rack 182a, 182b connected to the sliding block 170a. The orientation angle in degrees between the slot 164a and the axis of linear movement of a rack 182a, 182b connected to the sliding block 170a can vary from 0 degrees to 90 degrees. The transmission can generate the maximum linear reciprocal output or velocity at 90 degrees, i.e., when the slot 164a is orthogonal with the axis of linear movement of a rack 182a, 182b connected to the sliding block 170a, while the transmission can generate the minimum linear reciprocal output, effectively being in neutral or generating zero linear reciprocal output at 0 degrees, i.e., when the slot 164a is parallel with a slot 174a, 174b formed in the sliding block 170a, 170b as shown in FIGS. 4 and 7.

Figure 5:
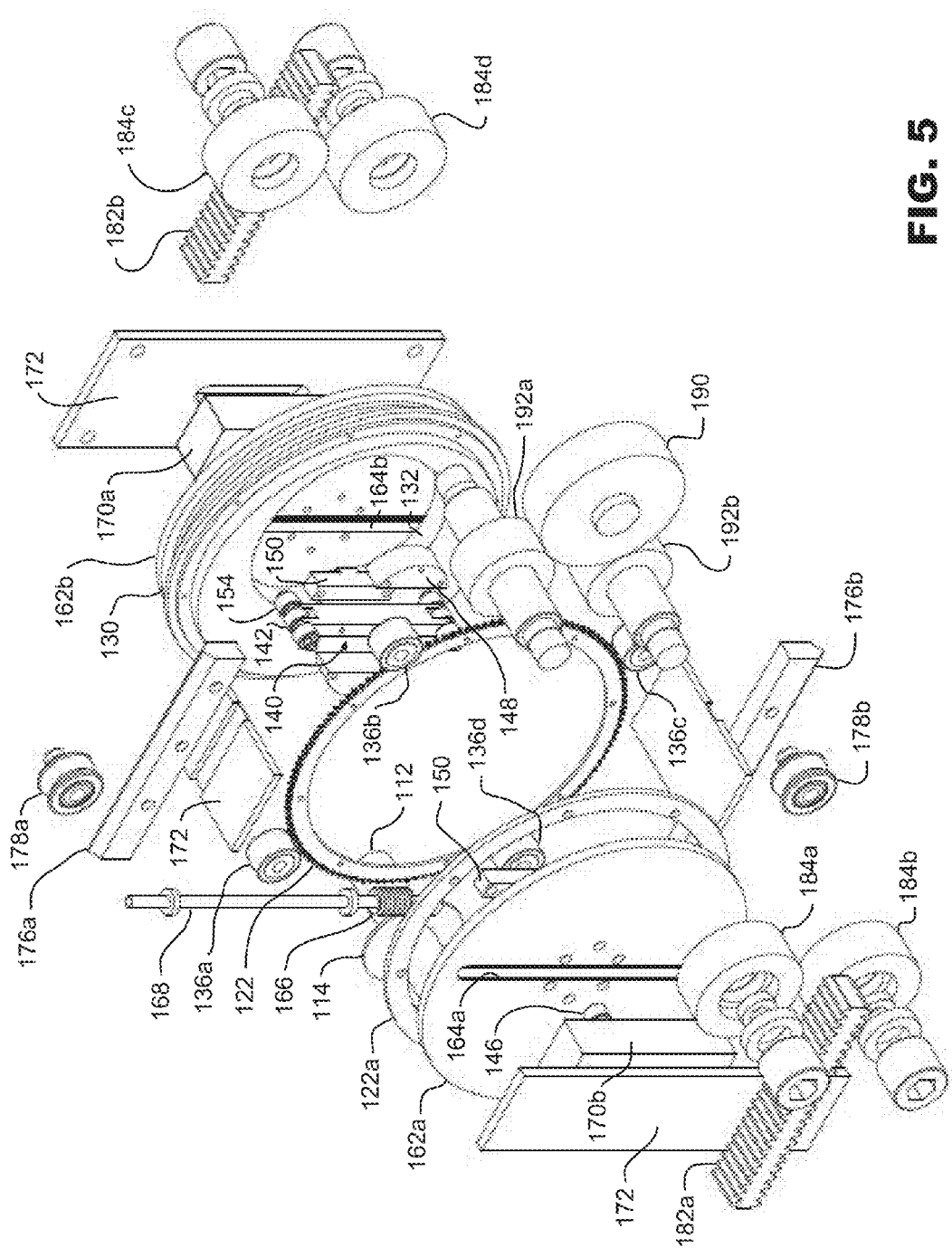
FIG. 5 is an exploded view of the CVT of FIGS. 1-4.

Referring now to FIG. 5, the two sliding blocks 170a and 170b are connected to first and second racks 182a, 182b, respectively. The first rack 182a can be coupled to first and second pinions 184a, 184b, whereas the second rack 182b can be coupled to third and fourth pinions 184c, 184d. The first to fourth pinions 184a, 184b, 184c, 184d are coupled to four bearings 188a, 188b, 188c, 188d and to four operable two-way clutches 186a, 186b, 186c, 186d, respectively. According to the back and forth movements of the first and second racks 182a, 182b, the first to fourth pinions 184a, 184b, 184c, 184d turn clockwise and counter-clockwise alternatively. However, the first to fourth clutches 186a, 186b, 186c, 186d selectively transmit torque only when the first to fourth pinions rotates in a selected rotary motion, either clockwise or counter-clockwise. Each of the first to fourth clutches 186a, 186b, 186c, 186d can deliver torque (e.g., power of clockwise and/or counter-clockwise movement) of the first to fourth pinions 184a, 184b, 184c, 184d into first and second spindles 194, 196, respectively. That is, the torque delivered by the first to fourth clutches 186a, 186b, 186c, 186d can rotate the first and second spindles 194, 196 in either rotary direction as desired based on the selected operation of the operable two-way clutches 186a, 186b, 186c, 186d. The first spindle 194 includes a first intermediate gear 192a. Likewise, the second spindle 196 includes a second intermediate gear 192b. Accordingly, by way of example and not limitation, if the first to fourth clutches 186a, 186b, 186c, 186d are selectively operated to transmit only clockwise torque, the first and second intermediate gears 192a and 192b would turn only clockwise. Otherwise, by way of example and not limitation, if the first to fourth clutches 186a, 186b, 186c, 186d are selectively operated to transmit only counter-clockwise torque, the first and second intermediate gears 192a and 192b would rotate only counter-clockwise.

Since the first to fourth pinions 184a, 184b, 184c, 184d do not always rotate in one-way direction, the first to fourth clutches 186a, 186b, 186c, 186d transmit torque alternatively. By way of example and not limitation, if the first to fourth clutches 186a, 186b, 186c, 186d are selectively operated to transmit only counter-clockwise torque, when the first and second racks 182a, 182b move forward, the first and third pinions 184a, 184c rotate counter-clockwise. The first and third clutches 186a, 186c transmit torque so that the first spindle is rotated counter-clockwise. That is, the first spindle 194 rotates counter-clockwise so that the first intermediate gear 192a turns counter-clockwise. Then, the third gear or transfer gear 190, which is operably engaged with the first intermediate gear 192a rotates clockwise. At that time, though the second and fourth pinions 184b, 184d rotates clockwise, while the second and fourth clutches 186b, 186d are disengaged and do not transmit any torque so that the second spindle 196 is not driven by rotary movement of the second and fourth pinions 184b, 184d. However, since the second intermediate gear 192b is engaged with the third gear 190 rotating clockwise, the second spindle 196 can be rotated while the second and fourth clutches 186b, 186d are disengaged. Although the second spindle 196 moves counter-clockwise, there is no conflict between the second spindle 196 and the second and fourth pinions 184b, 184d, which are rotating in the opposite way, because the second and fourth clutches 186b, 186d are disengaged and do not couple the second spindle 196 to the second and fourth pinions 184b, 184d for transmission of rotary motion therebetween while disengaged.

In a case when the first and second racks 182a, 182b move backward, the second and fourth pinions 184b, 184d rotate counter-clockwise, while the first and third pinions 184a, 184c rotate clockwise. The second and fourth clutches 186b, 186d are engaged to transmit rotary torque so that the second spindle 196 is rotated. That is, the second spindle 196 rotates counter-clockwise so that the second intermediate gear 192b turns counter-clockwise. Then, the third gear or transfer gear 190 engaged with the second intermediate gear 192b is driven in clockwise rotation. At that time, since the first and third pinions 184a, 184c rotate clockwise, the first and third clutches 186a,186c are disengaged and do not transmit any rotary torque so that the first spindle 194 is not driven in movement by the first and third pinions 184a, 184c. However, since the first intermediate gear 192a is engaged with the third gear 190 rotating clockwise, the first spindle 194 is rotated counter-clockwise. Although the first spindle 194 rotates counter-clockwise, there is no conflict between the first spindle 194 and the first and third pinions 184a, 184c, which are rotating in the opposite way, because the first and third clutches 186b, 186d are disengaged and do not couple the first spindle 196 to the first and third pinions 184a, 184c for transmission of rotary motion therebetween while disengaged.

As not shown, by way of example and not limitation, the transmission can include two-way clutches, instead of one-way clutches. Herein, the two-way clutch is configured to selectively change the clutch direction in accordance with a control system. Since the two-way clutch is endowed with the function of one-way clutch in forward and reverse rotational directions, the two-way clutch can be applied to the transmission to provide a reverse rotational direction of the output shaft 194 by reversing the functions of the two-way clutches on demand. In that case when the two-way clutch is applied, the first and second spindles can operate in forward and reverse rotational directions based on the selective on demand operation of the two-way clutches.

Figure 6:
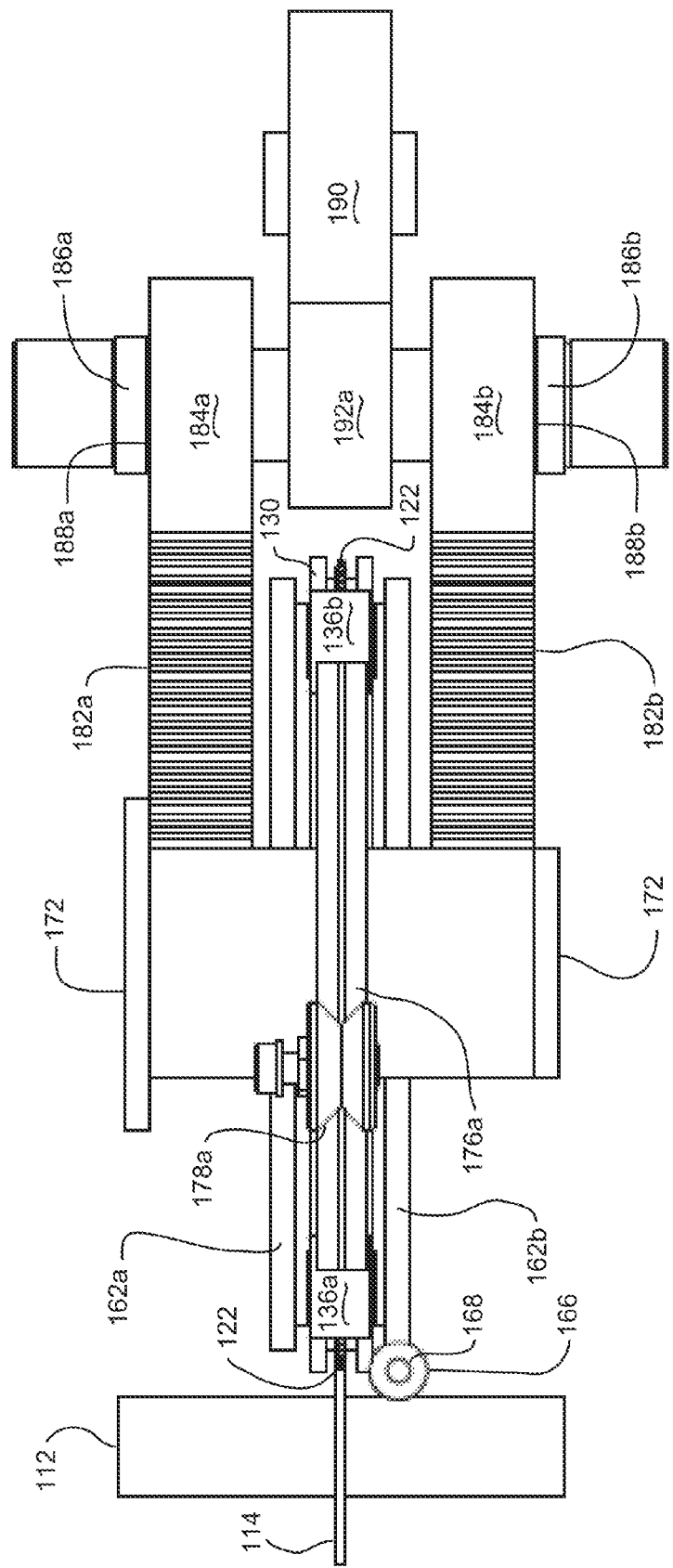
FIG. 6 is a top view of the CVT of FIGS. 1-5.

Referring now to FIG. 6, the input gear 114 can be engaged with the sprocket 122 supported by the cam member 130. On both sides of the cam member 130, there are located first and second ratio plates 162a, 162b. Although the worm gear 166 and shaft 168 are coupled only to the first ratio plate 162a, the first ratio plate 162a can be rotated in synchronization with the second ratio plate 162b through linkage connectors 148a, 148b best seen in FIGS. 8A-8D. The first and second racks 182a, 182b can be located between each ratio plates 162a, 162b and the corresponding sliders 172a, 172b. The first rack 182a can be aligned with the first and third pinions 184a, 184c, and the second rack 182b can be aligned with the second and fourth pinions 184b, 184d. The first and second intermediate gears 192a, 192b can be aligned with the third gear or transfer gear 190. Further, the input gear 114, the cam member 130, and the third gear 190 can be aligned along a straight line so that the transmission including the input gear 114, the cam member 130, and the third gear 190 requires minimal space. That is, the transmission can be manufactured to be compact for a small mechanical appliance.

As not shown, by way of example and not limitation, for compact design, the transmission can include a single ratio plate, a single slider, and a single rack. In this case, only two pinions can be required. Though the transmission having a single ratio plate can potentially have a disadvantage of increasing operational loads, but can have an advantage of a smaller and lighter design, the transmission could be used in a system operable in low power or at low velocity, such as a bicycle.

Referring now to FIG. 7, the cam follower assembly 140 moves in reciprocal linear motion within the cam member 130 and can be coupled to two sliding blocks 170a, 170b on opposite sides by output projections 146a, 146b. Here, the output projections 146a, 146b pass through the slots 164a, 164b included in the ratio plates 162a, 162b. That is, the movement of the output projections 146a, 146b are guided by the slots 164a, 164b of the first and second ratio plates 162a, 162b in order to change a rotary movement of the cam member 130 into a reciprocal linear movement of the cam follower assembly 140. The two sliding blocks 170a, 170b include slots 174a, 174b configured to receive linear movements transferred by the output projections 146a, 146b, respectively. The cam follower assembly 140, the ratio plates 162a, 162b, and the sliding block 170 are coupled through the output projections 146a, 146b. Since the output projections 146a, 146b are guided by slots 164a, 164b in the ratio plates 162a, 162b, the orientation of the cam follower assembly 140 within the cam member 130 can be controlled by synchronized angular rotation of the ratio plates 162a, 162b. The orientation of the cam follower assembly is controlled through interaction of the connector blocks 150a, 150b and rollers 154a, 154b, 154c, 154d within the slots 164a, 164b formed within the ratio plates 162a, 162b, respectively.

Referring now to FIGS. 1-7, two pinions are engaged with one rack coupled to one sliding block. However, as not shown, the combination of pinions and racks can be modified. For example, one sliding block can be coupled to two racks. In this case, one pinion located vertically between the two racks can have duplex structure. The duplex pinion is a kind of the union of two parallel pinions on a single spindle. One of the two racks is connected to one part of the duplex pinion, whereas the other of the two racks is connected to the other part of the duplex pinion. Since the duplex pinion is located between the two racks, the one part and the other part of the duplex pinion always rotate in opposing directions. Each part of the duplex pinion can include one-way clutch or two-way clutch. For example, when the two racks move forward, one part of the duplex pinion goes clockwise while the other part of the duplex pinion rotates counter-clockwise. If each part of the duplex pinion can include a one-way clutch configured to transmit torque when the input rotary movement is clockwise, then one clutch connected to the one part of the duplex pinion delivers torque into the single spindle. At that time, the other clutch connected to the other part of the duplex pinion does not transmit any torque because the other part of the duplex pinion rotates counter-clockwise. When the two racks move backward, the one part of the duplex pinion rolls counter-clockwise whereas the other part goes clockwise. At that time, the other clutch coupled to the other part of the duplex pinion transmits torque, but the one clutch coupled to the one part of the duplex pinion does not. Accordingly, the single spindle can rotate only one-way, e.g., clockwise.

Referring to FIGS. 1-7, there is a single cam follower assembly 140 moving along the cam surface 132 of the cam member 130. However, as not shown, the transmission can include two cam follower assemblies of a single cam member 130. That is, the two cam follower assemblies move along a single cam surface independently and separately. In this case, the two cam follower assemblies can generate two different velocity waveforms. The two cam follower assemblies are coupled to two ratio plates located on opposite sides of the cam member, respectively. The two ratio plates rotate in synchronization with each other, but slots included in the two ratio plates are oriented in different directions because the two cam follower assemblies move separately and independently of one another. For example, the slot in one ratio plate is arranged in an X-direction of a Cartesian coordinate system, whereas the slot in the other ratio plate is arranged in a Y-direction of the Cartesian coordinate system.

In the case when the two cam follower assemblies are included in the single cam member, sliding blocks, racks and pinions corresponding to the two ratio plates would be designed to move or react independently and separately from one another. For example, one of two sliding block can be oriented in an X-direction, while the other can be oriented in a Y-direction. Accordingly, some of the racks linearly move backward and forward in an X-direction, whereas the other of the racks linearly move backward and forward in a Y-direction. There can be two third gears, each for generating a periodic one-way velocity waveform, located on different positions in the transmission. Herein, the two one-way velocity waveforms outputted from the two third gears can have different phases.

Referring now to FIGS. 8A-8E, the cam follower assembly 140 can move with reciprocating linear movement in response to rotation of the cam member 130. Here, by way of example and not limitation, it is assumed that the cam follower assembly 140 is oriented in an X-direction of a Cartesian coordinate system by two ratio plates 162a, 164b. Accordingly, the cam member 130 can rotate fully through 360° rotation, whereas the cam follower assembly 140 linearly moves backward and forward in an X-direction. The linear reciprocal movement cam follower assembly 140 can be described as a displacement waveform 202a. The linear movement of the cam follower assembly 140 is periodically turned over at each turnover point 204. The velocity waveform 210a generated based on the movement of the cam follower assembly 140 is determined by the cam surface 132. That is, magnitude and period of the velocity waveform can depend on the shape and size of the cam surface 132.

Figure 8A:
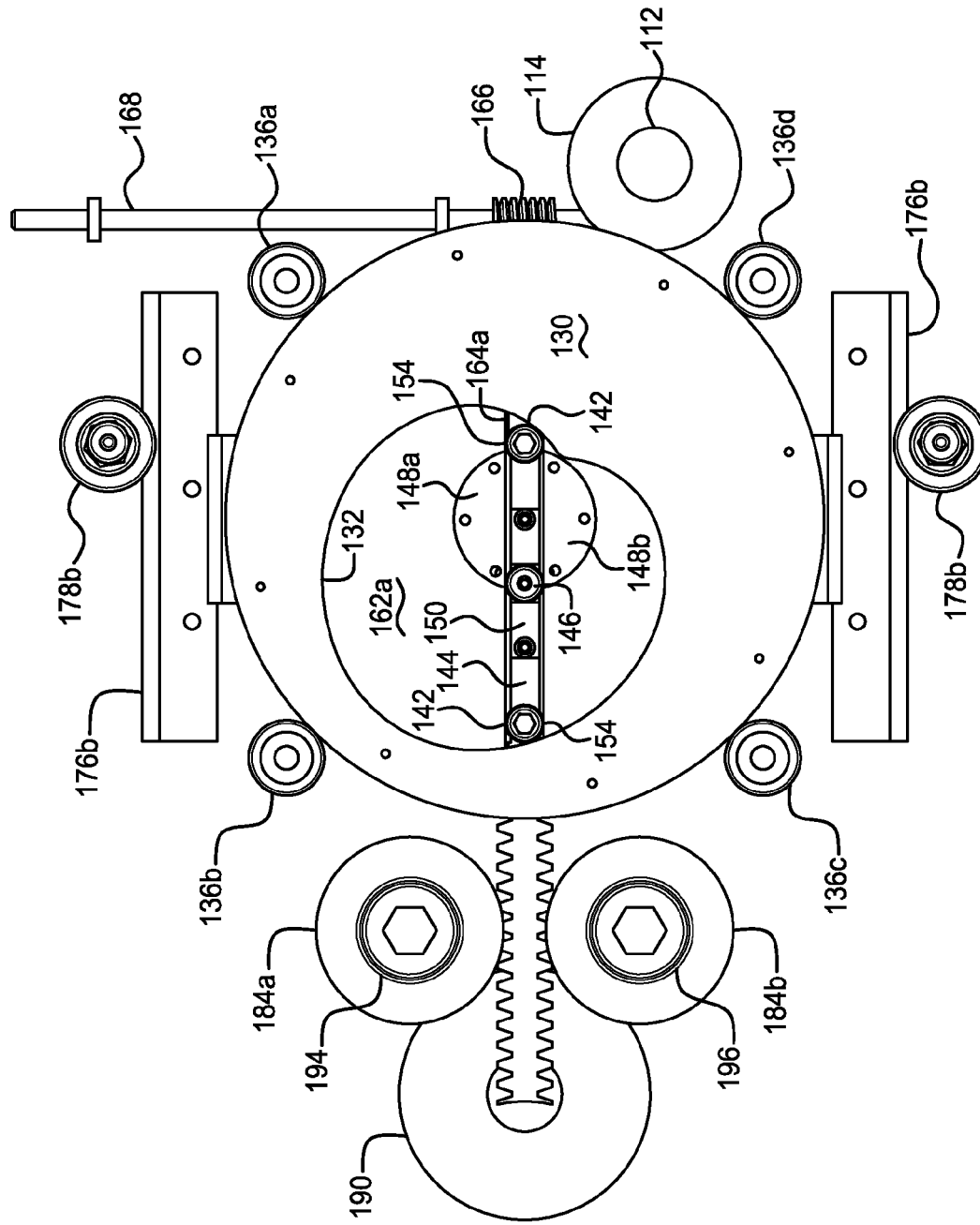
FIGS. 8A, 8B, 8C and 8D are cross sectional views of the CVT of FIGS. 1-7 showing movement of a cam follower assembly in response to rotation of a cam member between first, second, third and fourth angular orientations.
Figure 8B:
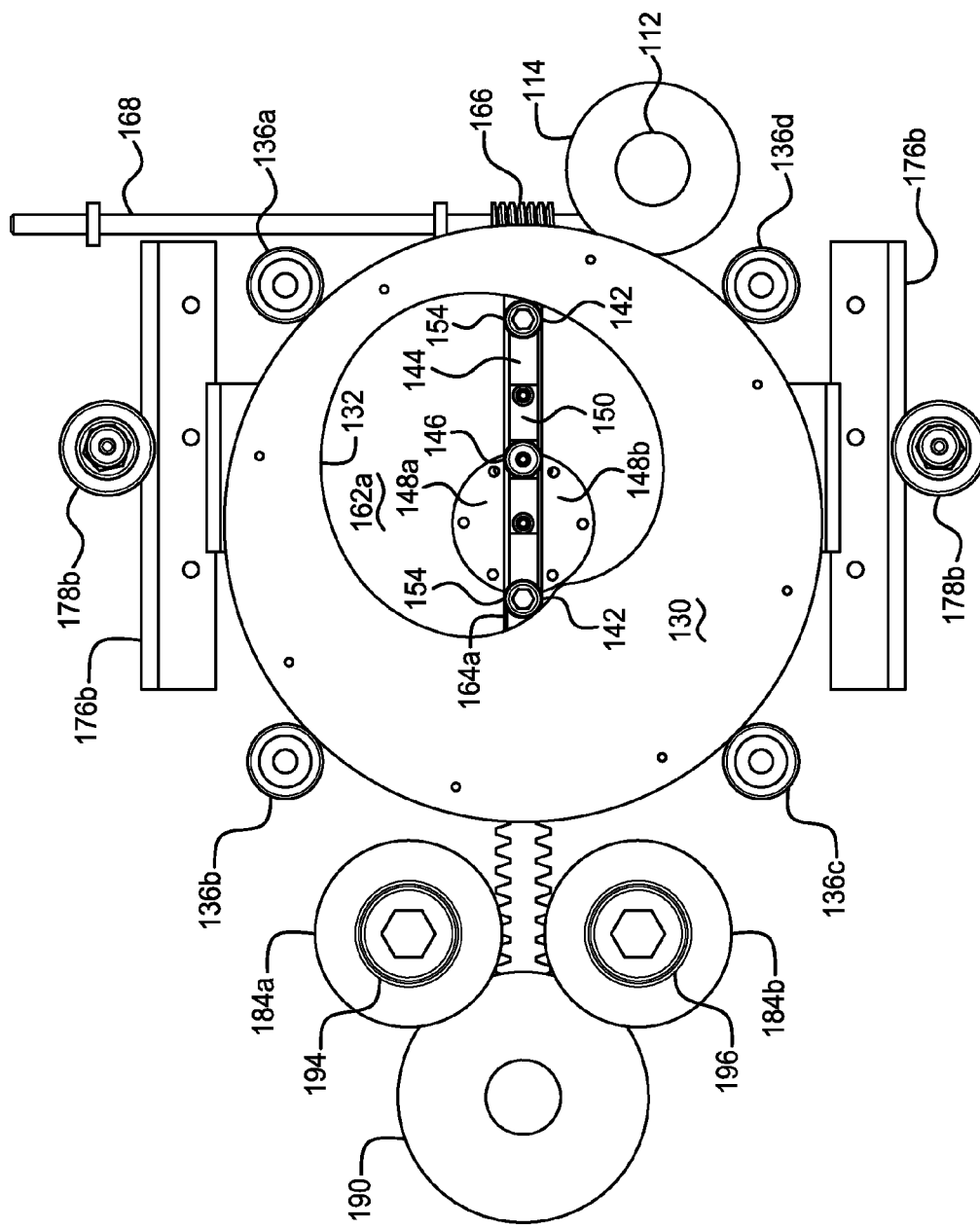
Figure 8C:
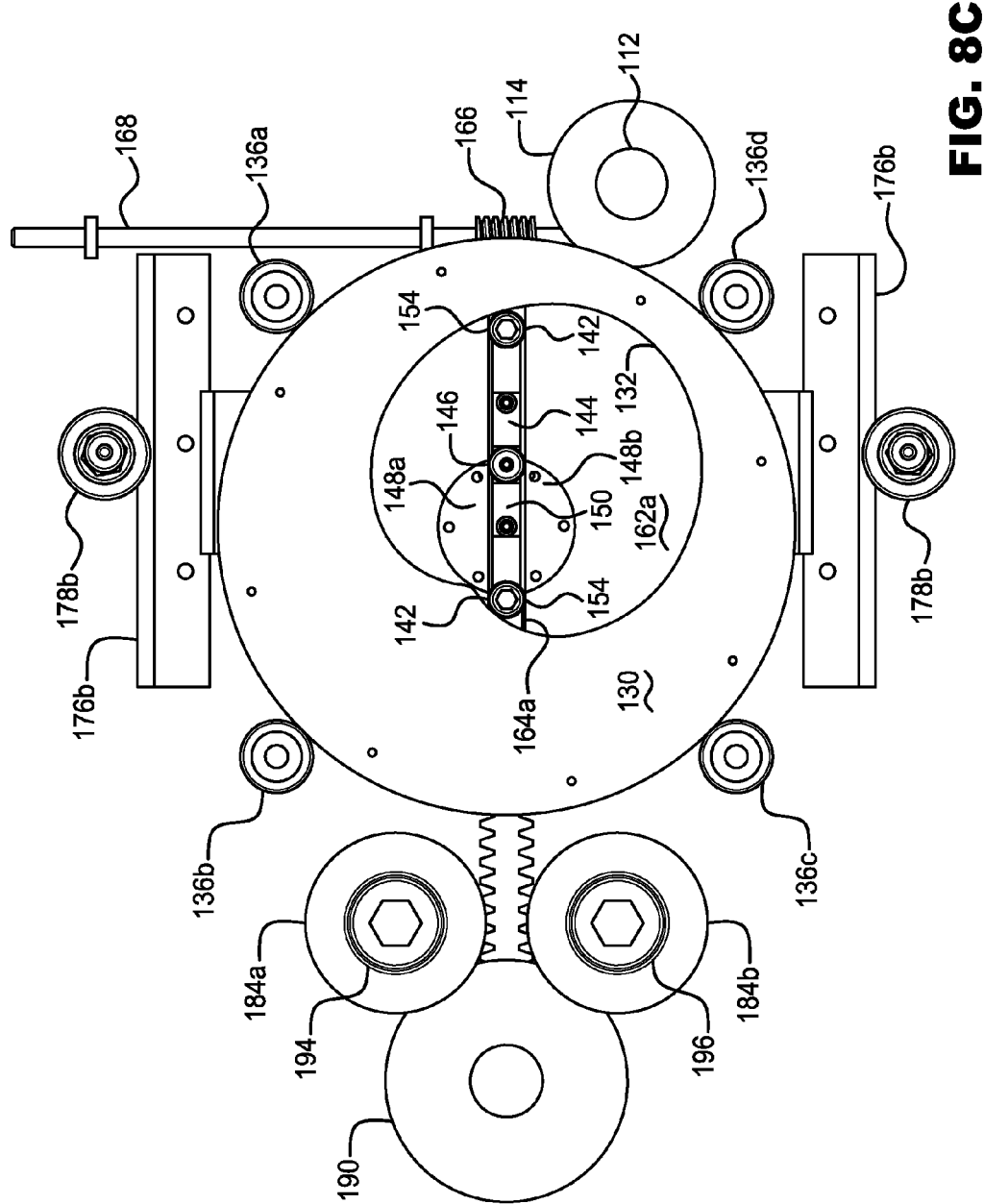
Figure 8D:
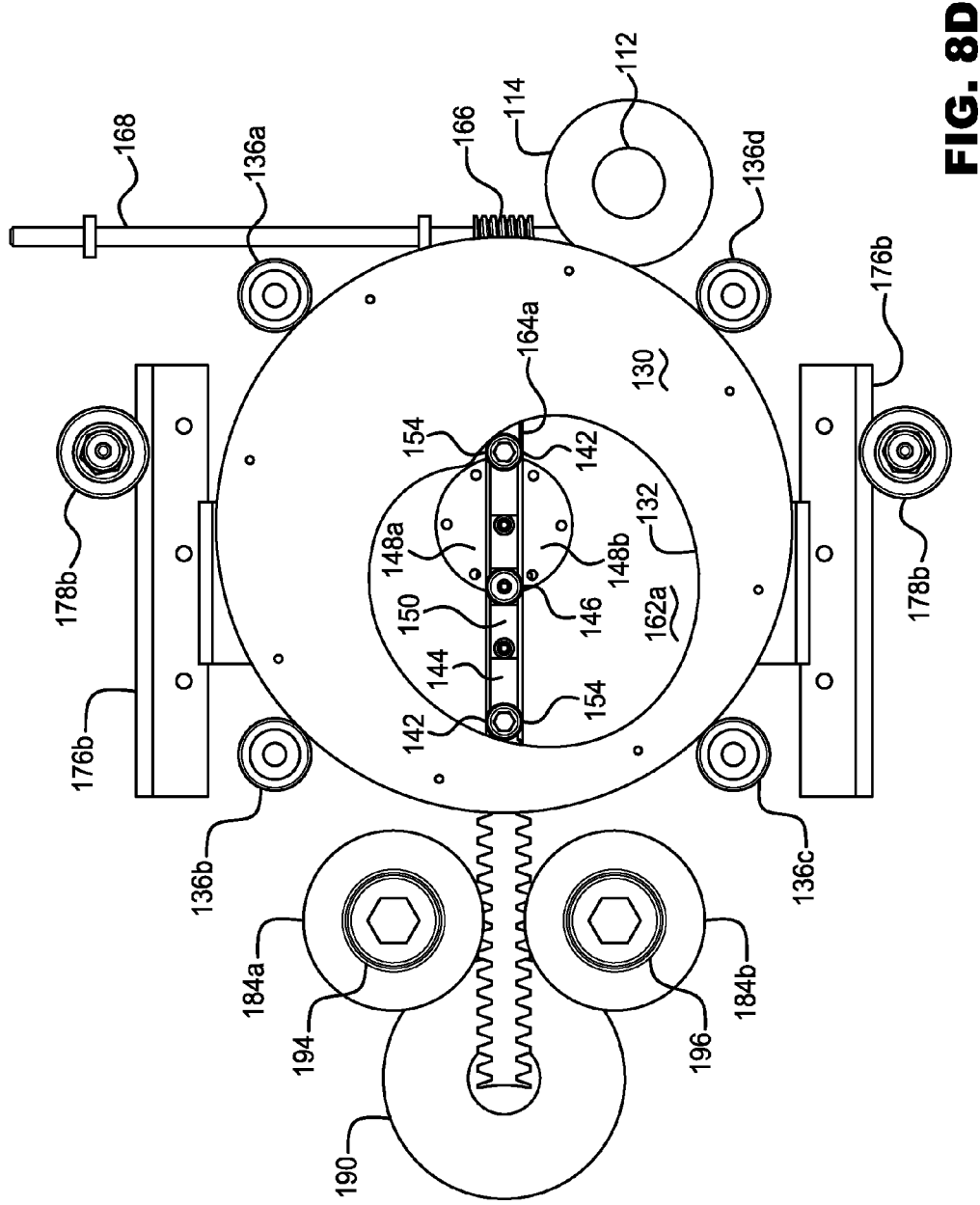
Figure 8E:
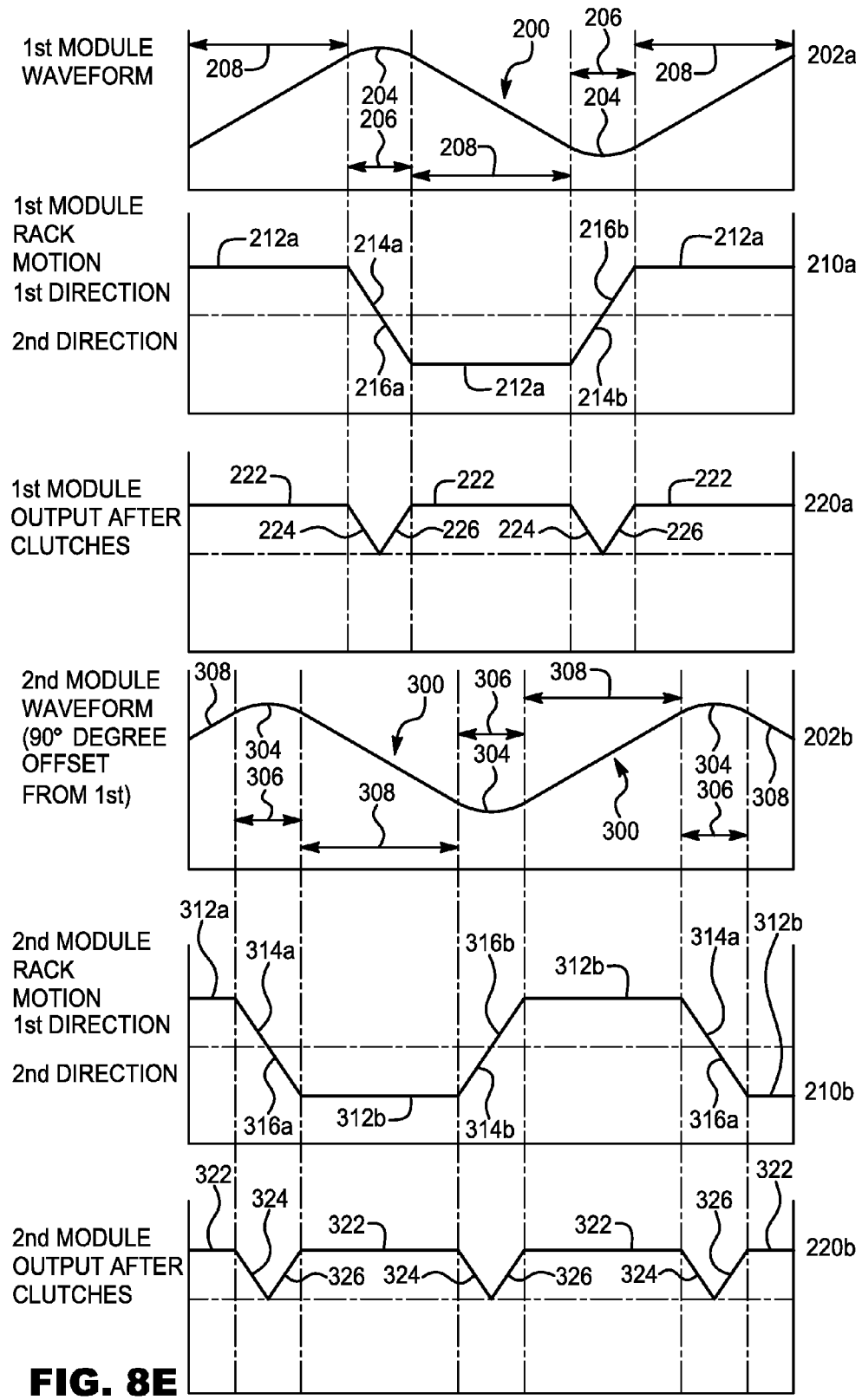
FIG. 8E is a graph having multiple interrelated parts illustrating displacement and velocity waveforms generated by a dual module CVT, having first and second modules as illustrated in FIGS. 1-8D, where the second module includes a cam member offset angularly by 90° with respect to the cam member of the first module.

The cam surface 132 can have a heart-type shape and can provide a symmetric velocity waveform 210a shown in FIG. 8E. The symmetric velocity waveform 210a has constant maximum portions 212a, 212b and linear change portions, each including linear decrease portions 214a, 214b and linear increase portions 216a, 216b. Two constant maximum portions 212a and 212b occur in different directions during each non-transition period 208. For example, one maximum portion 212a is generated when the first and second racks 182a, 182b move in a forward movement; while the other maximum portion 212b is generated when the first and second racks 182a, 182b move in a backward movement. The linear change portions occur during each transition period 206 include two-way portions: e.g., one decreasing portion 214a, 216a from the constant velocity 212a while racks 182a, 182b transition to forward movement to the constant velocity 212b while racks 182a, 182b transition to backward movement; and the other increasing portion 214b, 216b from the constant velocity 212b while the racks 182a, 182b transition to backward movement to the constant velocity 212a while the racks 182a, 182b transition to forward movement. Here, the linear change portions cross a point of velocity '0' whenever the back and forth movement of the first and second racks 182a, 182b is turned over at each turnover point 204.

The symmetric velocity waveform 210a is changed into one-way asymmetric velocity waveform 220a by the combination of the first to fourth clutches 188a, 188b, 118c, 188b, the first to fourth pinions 184a, 184b, 184c, 184d and the first and second racks 182a, 182b. Here, one-way asymmetric velocity waveform 220a can be defined as the absolute value (here, this is one-way direction) of the symmetric velocity waveform 210a. If the transmission does not include the first and second clutches 186a, 186b and all of the first to fourth pinions 184a, 184b, 184c, 184d are engaged with the first and second racks 182a and 182b, rotary movements of the first and third pinions 184a, 184c have 180° shifted phase from those of the second and fourth pinions 184b, 184d, because the first and third pinions 184a, 184c and the second and fourth pinions 184b, 184d are located on the opposite side of the first and second racks 182a, 182b.

The first and second clutches 188a, 188b selectively engage some of the first to fourth pinions so that the third gear 190 can generate one-way movement in a desired rotary direction. That is, the first and second clutches can function as selecting one-way (forward or backward) portions of two overlapped symmetric velocity waveforms 210a having a phase difference of 180 degrees. Thus, the movement of the third gear 190 can go after the one-way asymmetric velocity waveform 220a.

Here, a constant magnitude 222 of the one-way asymmetric velocity waveform 220a can be changed from the velocity '0' to a constant maximum velocity. A constant maximum velocity and an inclined slop, i.e., an acceleration ratio, of linear change portions in the symmetric velocity waveform 210a and one-way asymmetric velocity waveform 220a are determined based on orientation degree between the slots 164a, 164b of the first and second ratio plates 162a, 162b and the sliding blocks 170a, 170b. While the sliding blocks 170a, 170b are arranged in an X or a Y direction of a Cartesian coordinate system, the first and second ratio plates 162a, 162b can rotate through at least 90° degrees to provide scaling of the linear reciprocal motion between 0% and 100%. Accordingly, the orientation degree between the sliding blocks 170a, 170b and the slots 164a, 164b can have a range of 0° to 90° continuously and repeatedly. If the angular orientation is set to 90° (i.e. in other words parallel to the axis of reciprocation of the sliding blocks 170a, 170b), the transmission can output a maximum linear reciprocal motion or velocity. Otherwise, if the angular orientation is set to 0° (i.e. in other words perpendicular to the axis of reciprocation of the sliding blocks 170a, 170b), the transmission can generate a minimum linear reciprocal motion or zero velocity, i.e., no movement.

The symmetric velocity waveform 210a shown in FIG. 8E is a periodic because the cam follower assembly 140 can reciprocate in response to rotation through a full 360 degree of the cam surface 132. For example, during a single full 360 degree rotation of the cam surface 132, the symmetric velocity waveform 210a includes two constant velocity portions 212a, 212b and two linear change portions in every cycle. Each constant velocity portion 212a, 212b can occupy about ⅓ of each cycle, i.e., one period; and each linear change portion between the two constant velocity portions can occupy about ⅙ of each cycle.

While a maximum reciprocal linear movement output from the transmission can be adjustable based on the angular orientation of the ratio plates 162a, 162b. A constant velocity portion is determined by a shape of the cam surface 132, i.e., a constant velocity portion is not changeable during an operation. Thus, the slope (an acceleration ratio) of linear change portions of the symmetric velocity waveform can be determined by a maximum reciprocal linear movement output from the ratio plates 162a, 162b. That is, the acceleration ratio can be adjusted based on the angular orientation between the ratio plates 162a, 162b and the sliding blocks 170a, 170b.

While not shown, it should be recognized that the cam member 130 can include two separate cam follower assemblies, both moving along a single cam surface. In the case, the cam follower assemblies can be arranged at the right angle with respect to one another. Further, two ratio plates, each coupled independently and separately to each cam follower assembly, while have the same structure, but with slots of the two ratio plates arranged in different directions, e.g., one arranged in an X direction of Cartesian coordinate system and the other arranged in a Y direction of the Cartesian coordinate system. In that case, two sliding blocks, each associated independently and separately with a corresponding ratio plate, can move in different directions. For example, if one sliding block moves backward and forward from right side to left side, the other sliding block moves backward and forward from upper side to bottom side. Racks and pinions, coupled to the two sliding blocks, also moves in different ways corresponding to the movements of the two sliding blocks. Since the two sliding blocks move in different ways, there are two third gears, each for generating one-way movement, arranged in different directions. Accordingly, the transmission can include a combining unit for combining two different movements outputted from the two third gears. By way of example and not limitation, the combining unit can include a chain, a belt, a gear, and any other device coupled to the two third gears to combine outputs thereof.

In a case when the cam member 130 includes plural cam follower assemblies, the transmission can generate a constant one-way movement. Two cam follower assemblies can generate two different displacement waveforms 202a, 202b based on the different movements so that two different symmetric velocity waveforms 210a, 210b shown in FIG. 8E can be generated. Since the two cam follower assemblies are arranged at right angles with respect to one another, the two different symmetric velocity waveforms 210a, 210b can have a 90° phase difference. Through racks, pinions and clutches, the two different symmetric velocity waveforms 210a, 210b can be changed into two different one-way asymmetric velocity waveforms, e.g., 220a, respectively. The two one-way asymmetric velocity waveforms, e.g., 220a, still have 90° phase difference; but though a combining unit, the two one-way asymmetric velocity waveforms are combined into a constant velocity waveform. That is, if there are two one-way asymmetric velocity waveforms, e.g., 220a, having a 90° phase difference, the linear portions, e.g., 224, 226, are overlapped with the constant portion, e.g., 222, so that the transmission can generate a constant velocity waveform.

In details, as mentioned above, each one-way asymmetric velocity waveform 220a has two constant velocity portions 212a, 212b, each having about ⅓ period. That is, each non-transition period 208 can occupy one third of each cycle. There is a single linear change portion 222 between the transition period 206, and the linear change portion 224 or 226, i.e., each transition period 206, has about ⅙ period (it is about 60° range in a 360° cycle). In a case when two cam follower assemblies are arranged at the right angle, there is a 90° phase difference between two one-way asymmetric velocity waveforms, each generated from pinions corresponding to each cam follower assembly. Because of the 90° phase difference, a linear change portion of one one-way asymmetric velocity waveform can be sufficiently overlapped by a constant velocity portion of the other one-way asymmetric velocity waveform.

Figure 9:
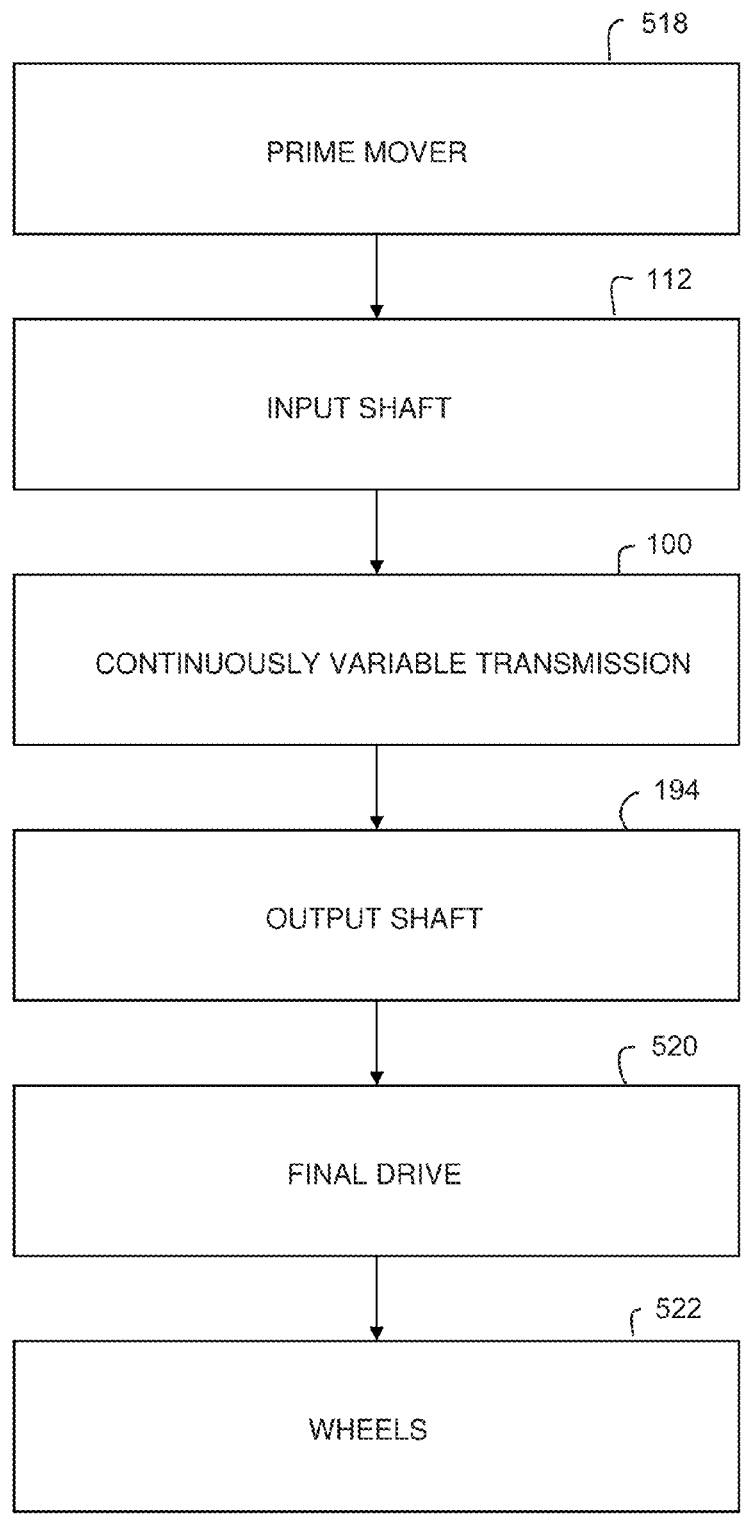
FIG. 9 is a simplified power flow schematic.
Figure 10:
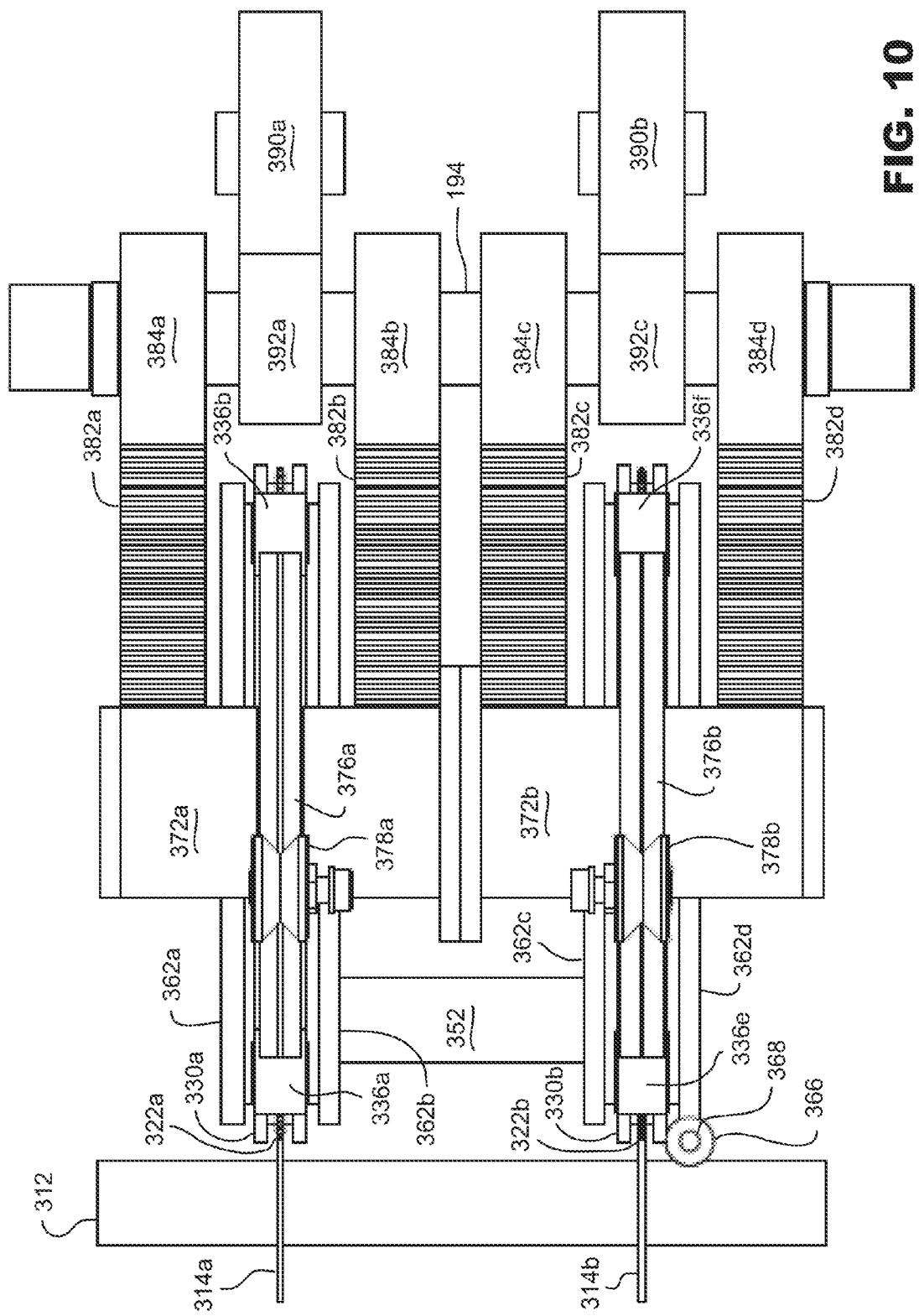
FIG. 10 is a top view of a dual module CVT.

The CVT can include three main elements, a DWG, a LDM and a DWC forming one modular unit. In a dual modular unit, a mechanical continuously variable transmission (CVT) 100 can be provided between an input shaft 112 powered by a prime mover 518 and an output shaft 194 connected to a final drive 520 to wheels 522 of the motor vehicle, as best seen in FIG. 9. The CVT 100 can include a first modular unit (as described with respect to FIGS. 1-8D above) combined with an identical second modular unit to form a single CVT 100. As depicted in FIGS. 9-10, the dual modular units share a common input shaft 112 transferring power from a prime mover 518 and a common output shaft 194 connected the wheels 522.

Figure 11:
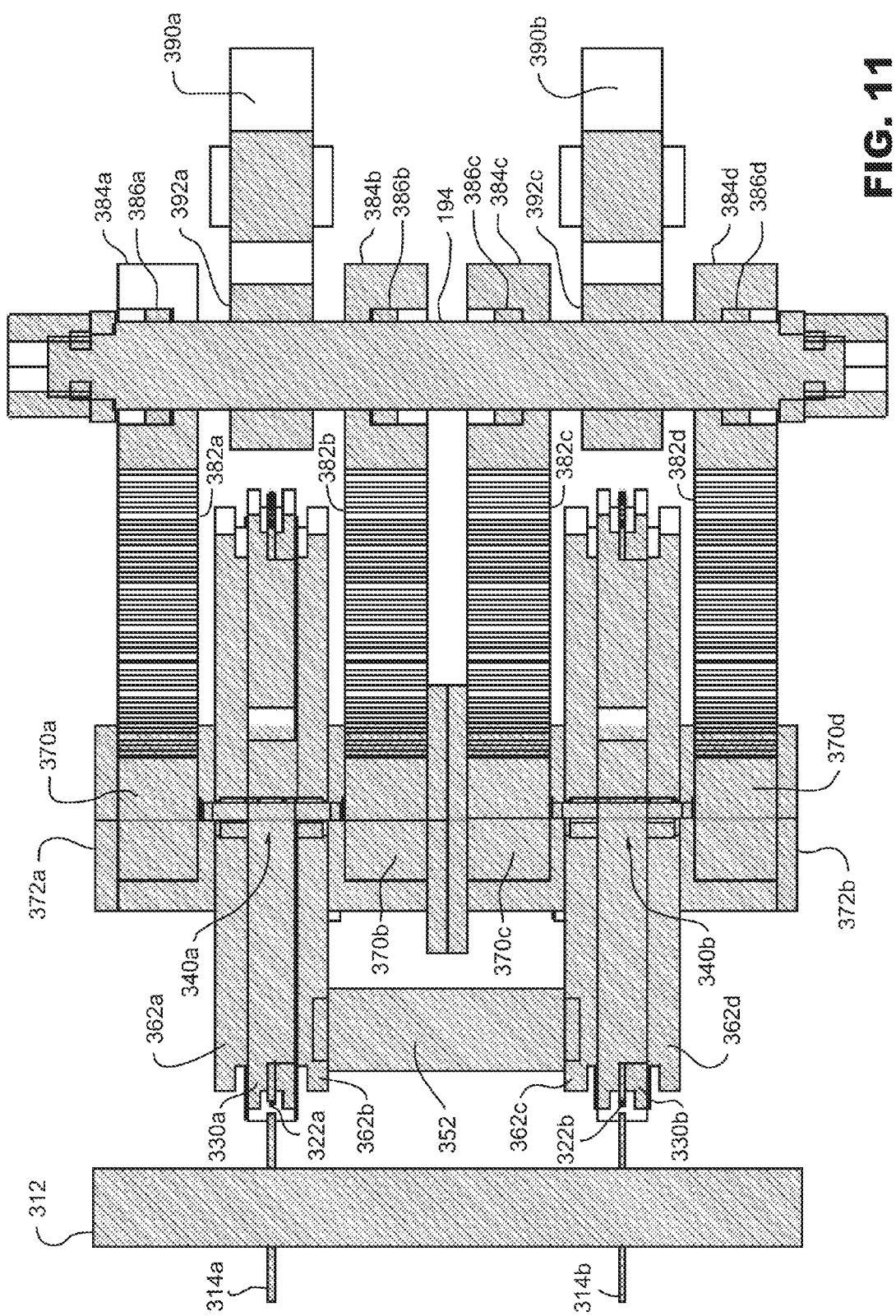
FIG. 11 is a section view of the dual module CVT.

As best seen in FIG. 8E, the CVT 100 includes at least two displacement waveform generators (DWG) for providing at least two angularly offset, identical periodic waveforms as shown by acceleration graphs 202*a* and 202*b*. The at least two angularly offset, identical periodic waveforms as shown by velocity graphs 210*a*, 210*b* include constant velocity portions 212*a*, 212*b*, 312*a*, 312*b*. The at least two periodic displacement waveforms 202*a*, 202*b* are offset in phase to provide continuous power output in a manner substantially reducing or eliminating jerking movement as a result of changes in velocity. The CVT can further include a linear displacement multiplier (LDM) for scaling the displacement waveforms. The LDM can include a ratio control assembly or member 362*a*, 362*b*, 362*c*, 362*d* and a slider block 372*a*, 372*b* as best seen in FIG. 10. The CVT can include a displacement waveform combiner (DWC) for combining the linear movement of a first direction with the linear movement of the second direction to provide an anti-symmetric displacement waveform as shown in the output graphs 220*a*, 220*b* to provide continuously variable, constant velocity rotary output when the waveform output is combined to drive a common output shaft 194 as best seen in FIGS. 10-11. The combiner can include at least one double sided rack 382*a*, 382*b*, 382*c*, 382*d* in combination with at least one pair of pinions 384*a*, 384*b*, 384*c*, 384*d* located on opposite sides of each double sided rack 382*a*, 382*b*, 382*c*, 382*d*.

As shown in FIGS. 9-11, the DWG of each modular unit can include a rotatable cam assembly or member 330*a*, 330*b* supporting corresponding sprockets 322*a*, 322*b* in communication with corresponding input gears 314*a*, 314*b* driven by the prime mover 518 through common input shaft 312. The prime mover 518 supplies power to corresponding input gears 314*a*, 314*b* via a common input shaft 312. Input gears 314*a*, 314*b* can operably engage with corresponding sprockets 322*a*, 322*b* fixed to the corresponding cam assembly or members 330*a*, 330*b*. In operation, each input gear 314*a*, 314*b* can rotate the corresponding rotary cam assembly or member 330*a*, 330*b* around a common fixed axis of rotation. Each rotary cam assembly or member 330*a*, 330*b* can be restrained in place by a plurality of equi-angularly spaced rollers 336*a*, 336*b*, 336*c*, 336*d*, as best seen in FIGS. 1-8D, which are supported from support structure (not shown) for the CVT. The rotary cam assembly or member 330*a*, 330*b* can be a hollow cam member 330*a*, 330*b* defined by an internal cam surface (similar to the cam surface 132 illustrated and described with respect to FIGS. 1-8D) for receiving a cam follower assembly 340*a*, 340*b* therein, as partially shown in the cross section of FIG. 11. Additional details regarding the configuration and operation of the cam follower assembly 340*a*, 340*b* can be obtained from the description of FIGS. 1-8D above with respect to cam follower assembly 140 for a single module unit. The cam follower assembly 340*a*, 340*b* rides along an inner annulus cam surface (similar to the internal cam surface 132 as illustrated and described with respect to FIGS. 1-8D) of the cam member 330*a*, 330*b* via rollers (similar to the rollers 142*a*, 142*b* as illustrated and described with respect to FIGS. 1-8D, and as best seen in FIGS. 3, and 7-8D). A pair of ratio control members 362*a*, 362*b*, 362*c*, 362*d* are positioned adjacent to each of the rotary cam members 330*a*, 330*b* and share a common axis of rotation. The ratio control assembly or members 362*a*, 362*b*, 362*c*, 362*d* can include each pair of ratio plates connected to one another via mechanical linkage blocks (similar to blocks 148*a*, 148*b* illustrated and described with respect to FIGS. 1-8D and as best seen in FIGS. 3 and 8A-8D). Each pair of ratio plates 362*a*, 362*b*, 362*c*, 362*d* can be connected to one another through a mechanical linkage connector 352 as best seen in FIG. 11. Each ratio plate 362*a*, 362*b*, 362*c*, 362*d* can have a corresponding slot (similar to slots 164*a*, 164*b* illustrated and described with respect to FIGS. 1-8D and as best seen in FIGS. 3-5 and 7-8D) which can receive a corresponding portion (similar to portion 150*a*, 150*b* and rollers 154*a*, 154*b*, 154*c*, 154*d* as best seen in FIG. 7 of the cam follower assembly 140). In operation, rotation of rotary cam assembly or members 330*a*, 330*b* support by rollers 336*a*, 336*b*, 336*c*, 336*d* can cause the internal cam surface to exert force on the cam follower assemblies 340*a*, 340*b* to provide a reciprocal linear first and second movement along the corresponding slots of the ratio plates 362*a*, 362*b*, 263*c*, 263*d*.

The reciprocal linear movement of cam follower assemblies 340*a*, 340*b* generates periodic displacement waveforms 202*a*, 202*b* best seen in FIG. 8E with a constant velocity portions 208, 308. The constant velocity portions 208, 308 corresponding to when the cam follower assembly moves with a constant velocity in either a first direction or a second direction, respectively. The non-constant velocity portions in transition periods 206, 306 correspond to when the cam follower assembly transitions from a first direction to second direction or vice versa. It is desirable to have the transition periods 206, 306 be much smaller than the constant velocity portions 208, 308 to reduce changes in acceleration and/or velocity in the system. Points 204, 304 denotes where the cam follower assembly switches between the first direction and the second direction corresponding to zero velocity portions. Displacement waveforms 202*a*, 202*b* corresponds to velocity waveforms 210*a*, 210*b* of the displacement waveforms 200, 300 respectively. The velocity waveforms have a constant velocity portion 212*a*, 212*b*, 312*a*, 312*b* and substantially linear deceleration portions 214*a*, 314*a* and substantially linear acceleration portions 216*a*, 316*a*.

The ratio plates 362*a*, 362*b*, 362*c*, 362*d* are a ratio control assembly or mechanism for modifying an angular orientation of the cam follower assemblies 340*a*, 340*b* with respect to the corresponding racks 382*a*, 382*b*, 382*c*, 382*d*. Each pair of ratio plates 362*a*, 362*b*; 362*c*, 362*d* associated with a corresponding cam member 330*a*; 330*b* are synchronized via internal linkage blocks (similar to blocks 148*a*, 148*b* best seen in FIGS. 8A-8D) and external linkage connector 352, such that the corresponding slots 364*a*, 364*b*; 364*c*, 364*d* have a common orientation and engage in synchronized movement in response to being driven by worm gear 366 via shaft 368. Each pair of ratio plates 362*a*, 362*b*; 362*c*, 362*d* are mechanically linked via external connector 352 and a single worm gear 366 can operably rotate both pairs of ratio plates 362*a*, 362*b*; 362*c*, 362*d*. However, it should be recognized that each ratio plate could have a corresponding worm gear with a synchronized drive mechanism for all corresponding worm gears. It should further be recognized that, any device known by a person having ordinary skill in the art could be used to rotate the ratio plates in a synchronized manner.

When the ratio plates 362a, 362b, 362c, 362d position the cam follower assemblies 340a, 340b to have reciprocal linear movement parallel to the corresponding racks 382a, 382b, 382c, 382d, the CVT is under full power or transferring 100% of the reciprocal linear movement to rotary output motion. When the ratio plates 362a, 362b, 362c, 362d adjust the reciprocal linear movement to be orthogonal to the corresponding racks 382a, 382b, 382c, 382d, the CVT is effectively in neutral or transferring 0% of the reciprocal linear movement to rotary output motion. Correspondingly, with the ratio plates 362a, 362b, 362c, 362d at an angular orientation of 45° with respect to the corresponding racks 382a, 382b, 382c, 382d, the CVT transfers 50% of the reciprocal linear movement to rotary output motion. The ratio plates 362a, 362b, 362c, 362d can be rotatable through at least 90° in order to have a full range of power ratios. It should be recognized by any one of ordinary skill in the art that the ratio plates 362a, 362b, 362c, 362d can be rotatable through 90° or 180°, and any other combination in between.

A pair of sliding blocks 372a, 372b can include sliders 370a, 370b, 370c, 370d as illustrated in FIG. 11. Each slider 370a, 370b, 370c, 370d can be located adjacent to a corresponding ratio plate 362a, 362b, 362c, 362d. The sliders 370a, 370b, 370c, 370d are attached at an outer side to the corresponding sliding block assembly 372a, 372b. Each slider 370a, 370b, 370c, 370d can include a corresponding slot (similar to slot 174a, 174b illustrated and described with respect to sliders 170a, 170b of FIG. 7) which extend perpendicular to the corresponding racks 382a, 382b, 382c, 382d. Power can be transferred from the cam follower assembly 340a, 340b to the sliders 370a, 370b, 370c, 370d via rollers (similar to rollers 154a, 154b, 154c, 154d illustrated and described with respect to cam follower assembly 140 in FIG. 7) which are received in slots (similar to slots 174a, 174b illustrated and described with respect to sliders 170a, 170b in FIG. 7). The sliders 370a, 370b, 370c, 370d are for receiving the periodic displacement waveform from the corresponding cam follower assemblies 340a, 340b and for generating a scaled reciprocal linear movement output through corresponding racks 382a, 382b, 382c, 382d.

A polar force vector from the corresponding cam follower assemblies 340a, 340b can be transformed into two Cartesian coordinate force vectors such that a single Cartesian coordinate force vector motion output extending parallel to the corresponding racks 382a, 382b, 382c, 382d is captured and transferred to the sliding blocks 372a, 372b, while allowing a perpendicular Cartesian force vector to be converted into lost motion along the slots (similar to slots 174a, 174a in sliders 170a, 170 illustrated and described in FIG. 7). The Cartesian force vector extending parallel to the corresponding racks 382a, 382b, 382c, 382d can be transferred from the corresponding cam follower assemblies 340a, 340b into corresponding side walls of the slots (similar to slots 174a, 174a in sliders 170a, 170 illustrated and described in FIG. 7) via rollers (similar to rollers 146a, 146b illustrated and described with respect to FIGS. 3, 5, and 7-8D) causing the corresponding sliding blocks 372a, 372b to oscillate back and forth along a pair of guide rollers 378a, 378b positioned above and below each sliding block 372a, 372b (similar to rollers 178a, 178b illustrated and described with respect to FIGS. 1-8D).

The sliding block assemblies 372a, 372b can include a rectangular structure defined by four metal plates connected to each other. Attached to each of the sliding block assemblies 372a, 372b are a pair of guide rails 376a, 376b connected on opposite sides of the sliding block assemblies 372a, 372b (similar to guide rails 176a, 176b illustrated and described with respect to FIGS. 1-8D). The pair of guide rails 376a, 376b in combination with the pair of guide rollers 378a, 378b (similar to guide rollers 178a, 178b illustrated and described with respect to FIGS. 1-8D), attached to support structure of the CVT housing, support the corresponding sliding block assemblies 372a, 372b and allow for the corresponding sliding block assemblies 372a, 372b to oscillate back and forth according to movement of the corresponding cam follower assemblies 340a, 340b as scaled by the interaction with the ratio plates 362a, 362b, 362c, 362d and the corresponding slider 370a, 370b, 370c, 370d.

Attached to each of the corresponding sliding block assemblies 372a, 372b is a pair of racks 382a, 382b; 382c, 382d, where one rack can be located on each side of the corresponding sliding assemblies 372a, 372b. The racks 382a, 382b; 382c, 382d are attached to the corresponding sliding assemblies 372a, 372b proximate the center of the corresponding sliders 370a, 370b; 370c, 370d. Each of the racks 382a, 382b, 382c, 382d engage with a pair of pinions 384a, 384b, 384c, 394d located on opposite sides of the double sided racks 382a, 382b; 382c, 382d to transform reciprocal linear motion of the racks 382a, 382b; 382c, 382d into rotational motion for output to the wheels. Each rack and pinion combination can include a double sided rack 382a, 382b; 382c, 382d vertically sandwiched between an output shaft 194 and a transfer shaft (similar to transfer shaft 196 illustrated and described with respect to FIGS. 1-8D). The top teeth of each double sided rack 382a, 382b; 382c, 382d engage with corresponding upper pinions of the pair of pinions 384a, 384b, 384c, 384d respectively attached to the output shaft 194. The bottom teeth of each double sided rack 382a, 382b; 382c, 382d engage with corresponding lower pinions of the pair of pinions 384a, 384b, 384c, 384d attached to the transfer shaft (similar to transfer shaft 196 illustrated and described with respect to FIGS. 1-8D). The output shaft 194 and the transfer shaft cooperate with one another through transfer gears 390a, 390b. a pair of intermediate gears 392a, 392c can be attached to the output shaft 194 to engage with transfer gears 390a, 390b, which in turn can engage intermediate gears on the transfer shaft (similar to intermediate gear 192 illustrated and described with respect to FIGS. 2-5). It is to be recognized that either shaft can be the output shaft 194, while the other shaft can be the transfer shaft.

The upper and lower pinions of each pair of pinions 384a, 384b, 384c, 384d are selectively connected to corresponding output and transfer shafts via corresponding operable pairs of clutches 386a, 386b, 386c, 386d as best seen in FIG. 11. By way of example and not limitation, the clutches can be either one-way clutches or two-way clutches. Two-way clutches can be operable to provide a reverse rotational output shaft drive direction from the continuously variable transmission. The pairs of clutches 386a, 386b, 386c, 386d can have electrical actuators, hydraulic actuators, mechanical actuators, or any combination thereof. Each pair of pinions 384a, 384b, 384c, 384d can be supported by a bearing as is conventional to facilitate free rotation when not engaged by the corresponding clutch.

The dual modular units can be identical to one another in structure, except that the periodic waveform of one modular unit is angularly offset with respect to the periodic waveform of the other modular unit as best seen in FIG. 8E. This can be accomplished by offsetting the angular orientation of one cam member 330a, 330b with respect to the other cam member 330b, 330a by a predetermined amount. By way of example and not limitation, by a 90° angular offset as illustrated in FIG. 8E for a dual module configuration. In a dual module configuration a constant velocity portion 212a of one modular unit overlaps a non-constant portion 314a, 316a of the periodic waveform of the other modular unit. This ensures that the CVT has a constant power feed to output shaft 194. The offset can be accomplished by orienting the cam members 330a, 330b at different angular positions with respect to each other, which in turn places the location of the two cam follower assemblies 340 in different positions along the slots (similar to the slots 164a, 164b of ratio plates 162a, 162b as illustrated and described with respect to FIGS. 1-8D) of ratio plates 362a, 362b, 362c, 362d, thus insuring that a change from a first direction to a second direction of the cam follower assemblies 340a, 340b occurs at different times.

In a dual modular unit configuration, modular units are located adjacent to each other sharing a common axis of rotation and have a common input shaft 312 and a common output shaft 194. The pair of ratio plates 362a, 362b of one modular unit are synchronized with the pair of ratio plates 362c, 362d of another modular unit via a mechanical linkage 352. By way of example and not limitation, the modular units can be aligned in a side-by-side configuration, or in a stacked configuration, or an offset side-by-side configuration if desired.

FIGS. 12-13 schematically depict a thinner variant of a dual module CVT 100 compared with that illustrated in FIGS. 10-11. In the CVT as illustrated in FIGS. 12-13, each modular unit can have a cam member interposed between a pair of ratio plates 462, a single slider 476a, 476b and a pair of double sided racks 482a, 482b, 482c, 482d. Each module can have a cam follower assembly 440 received within the hollow cam member and can generate a reciprocal linear movement in response to rotation of the inner cam surface as previously described with respect to FIGS. 1-11. The cam members can be support by equi-angularly spaced rollers 436a (only one of which is illustrated for simplicity) The reciprocal linear movement of the each cam follower assemblies 440 can be controlled by a pair of ratio plates 462, each ratio plate 462 having a slot 464 which receives the corresponding cam follower assembly 440. In this configuration, the support structure 498a, 498b for the continuously variable transmission is illustrated. Connecting blocks 500a, 500b, 500c, 500d attach the support structure of the dual modular units with respect to one another. The cam members are driven by a common input shaft 112 through an input drive gear 114 as previously described above. In the illustrated configuration, the sliding block is connected to the output roller of the cam follower assembly and the sliding block is reciprocal along slot 474 to affect lost motion of the perpendicular Cartesian force vector while allowing reciprocation of the sliders 476a, 476b in a direction parallel to racks 482a, 482b, 482c, 482d. The two pairs of ratio plates 462 can be connected for synchronized movement through a mechanical linkage 452 (similar to linkage 352 as illustrated and described with respect to FIGS. 10-11). The double sided racks 482a, 482b, 482c, 482d operably engage with corresponding pairs of pinions 482a, 482b; 482c, 482d; 482e, 482g; 482f, 482h. As previously described, the pairs of pinions are connected to corresponding output shaft 494 and transfer shaft 496a, 496b by operable clutches 488a, 488b, 488c, 488d, 488e, 488f, 488g, 488h. Pairs of intermediate gears 492a, 492b; 492c, 492d are connected to the output shaft 494 and transfer shafts 496a, 496b to transfer rotary motion through transfer gears 490a from the transfer shafts 496a, 496b to the output shaft 494 to provide a constant rotary motion of overlapping waveforms 220a, 220b when outputs 222, 322 are combined as depicted in FIG. 8E.

In conclusion, a continuously variable transmission (CVT) is disclosed having a displacement waveform generator (DWG) creating a periodic displacement waveform with a constant velocity portion. A linear displacement multiplier (LDM) can convert the periodic displacement anti-symmetric waveform into Cartesian coordinate force vectors scalable in range between at least 0% and +100%, inclusive, as a scaled linear displacement waveform output. The DWG can cooperate with the LDM to create a reciprocal linear forward and reverse movement. A scaled linear displacement waveform combiner (DWC) can convert the reciprocal linear forward and reverse movement into rotary output.

A continuously variable transmission (CVT) can connect a rotary input shaft from a primary mover of a motor vehicle to an output shaft for driving wheels of the motor vehicle. The CVT can include at least two displacement waveform generators (DWG) sharing an axis of rotation and providing at least two identical periodic displacement waveforms offset in phase with respect to one another, where each generated waveform has a constant velocity portion. At least two synchronized linear displacement multipliers (LDM) can be provided, one for each of the at least two angularly offset, identical, periodic displacement waveforms. Each LDM can convert the periodic displacement waveform into Cartesian coordinate force vectors scalable in a range between at least 0% and +100%, inclusive, as a scaled linear displacement waveform output. Each DWG can cooperate with an associated LDM to create a corresponding reciprocal linear movement. At least two scaled linear displacement waveform combiners (DWC) can convert the reciprocal linear movement of each DWG into rotary output.

A method is also disclosed for providing a continuously variable transmission (CVT) between a rotatable input shaft and a rotatable output shaft. The method can include generating a periodic displacement anti-symmetric waveform with a displacement waveform generator (DWG), where the waveform has a constant velocity portion. The method converts the periodic displacement anti-symmetric waveforms into Cartesian coordinate force vectors scalable in a range between at least 0% and +100%, inclusive, as a linear scaled displacement waveform output with a linear displacement multiplier (LDM). The DWG cooperates with the LDM to create a reciprocal linear forward and reverse movement. The method converts the reciprocal linear forward and reverse movement into rotary output with a scaled linear displacement waveform combiner (DWC).

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A continuously variable transmission comprising:
a rotary cam member having an input axis of rotation and defining a cam surface operably engaged with at least one cam follower assembly, each cam follower assembly for generating a displacement waveform with a constant velocity portion;
a rotatable ratio control assembly selectively controlling an angular orientation of the at least one cam follower assembly with respect to the cam surface, the rotatable ratio control assembly including at least one ratio plate extending generally perpendicular with respect to the input axis of the rotary cam member restraining the at least one cam follower assembly for reciprocal linear movement and for scaling a reciprocal linear output movement of the reciprocal linear movement between 0% and 100% inclusive in response to an angular orientation of the at least one ratio plate of the ratio control assembly with respect to the input axis of rotation of the rotary cam member, wherein the ratio control assembly includes the at least one ratio plate adjustable angularly through at least a 90° arc about an axis of rotation, the ratio plate including a slot guiding the reciprocal linear movement of the cam follower assembly, at least one slide block configured to extract a Cartesian coordinate component of the reciprocal linear movement of the corresponding cam follower assembly, each slide block having a corresponding ratio plate and operably connected to a cam follower assembly;
an output assembly for converting the scaled reciprocal linear output movement into at least intermittent, continuously variable, constant velocity, rotary output about an output axis of rotation; and
an actuator operable to rotate the at least one ratio plate with respect to the input axis of rotation of the rotary cam member, wherein an angular orientation of the at least one ratio plate adjusts the reciprocal linear movement of the cam follower assembly acting on the output assembly, the actuator operable to rotate the at least one ratio plate, wherein an angular orientation of the at least one ratio plate adjusts the Cartesian coordinate component of the reciprocal linear movement of the cam follower assembly acting on the slide block.

2. The continuously variable transmission of claim 1 further comprising the rotary cam member is rotatable in response to a rotary input movement, the rotary cam member including an interior cam surface defining a hollow space, and the at least one cam follower assembly including at least one cam follower located within the hollow space in contact with the interior cam surface and displaceable in response to rotation of the rotary cam member, wherein a displacement waveform is generated based on a size and shape of the interior cam surface.

3. The continuously variable transmission of claim 1, wherein the displacement waveform generated by the cam follower assembly movable along the cam surface of the cam member is a symmetric and periodic waveform having a constant portion and a transition portion, such that the ratio control assembly adjusts a reciprocal output magnitude of the displacement waveform.

4. The continuously variable transmission of claim 1, wherein the ratio control assembly further comprises:
two ratio plates with the cam member located between the two ratio plates, the two ratio plates connected to each other for synchronized movement with respect to one another, each ratio plate having a slot to slidingly receive a portion of at least one cam follower assembly for restrained reciprocal linear movement defining a corresponding displacement waveform output.

5. The continuously variable transmission of claim 1, wherein the output assembly further comprises:
at least one rack operably engaged with the slide block for delivering the scaled reciprocal linear output movement;
at least one pair of pinions operably engageable with the at least one rack for rotation in response to the scaled reciprocal linear output movement of the at least one rack;
at least one pair of clutches, one clutch operably engageable with each pinion for selectively transmitting torque from each pinion; and
at least one spindle supporting the at least one pair of clutches for selectively receiving transmitted torque from each pinion in response to engagement of the corresponding clutch.

6. The continuously variable transmission of claim 5, wherein the output assembly further comprises:
the at least one rack including first and second double sided racks located on opposite sides of the cam member;
the at least one pair of pinions including first and second pairs of pinions, each pair of pinions operably engaged on opposite sides of a corresponding one of the first and second double sided racks; and
the at least one pair of clutches including first and second pairs of clutches, one clutch operably engageable with each pinion for selectively transmitting torque from each pinion.

7. A continuously variable transmission comprising:
a rotary cam member defining a cam surface operably engaged with at least one cam follower assembly, each cam follower assembly for generating a displacement waveform with a constant velocity portion;
a rotatable ratio control assembly restraining the at least one cam follower assembly for reciprocal linear movement and for scaling a reciprocal linear output movement of the reciprocal linear movement between 0% and 100% inclusive in response to an angular orientation of the ratio control assembly; and
an output assembly for converting the scaled reciprocal linear output movement into at least intermittent, continuously variable, constant velocity, rotary output, wherein the output includes at least one rack operably engaged with the slide block for delivering the scaled reciprocal linear output movement, at least one pair of pinions operably engageable with the at least one rack for rotation in response to the scaled reciprocal linear output movement of the at least one rack, at least one pair of clutches, one clutch operably engageable with each pinion for selectively transmitting torque from each pinion, at least one spindle supporting the at least one pair of clutches for selectively receiving transmitted torque from each pinion in response to engagement of the corresponding clutch, the at least one spindle including a primary output spindle and a secondary spindle, first and second intermediate gears, the first intermediate gear coupled to the primary spindle and the second intermediate gear coupled to the secondary spindle for delivering rotational movement between the spindles, and a transfer gear engaging with the first and second intermediate gears for transferring rotation from the secondary spindle to the primary output spindle.

8. The continuously variable transmission of claim 1, wherein the at least one cam follower assembly further comprises:
- two cam follower assemblies for generating two displacement waveforms offset in phase with respect to one another.

9. The continuously variable transmission of claim 8, wherein the output assembly further comprises:
- a combiner for combining the two displacement waveforms into rotary output.

10. A continuously variable transmission for connection of a rotary input shaft from a primary mover of a motor vehicle to an output shaft connected to driving wheels of the motor vehicle comprising:
- at least two rotary cam members having an input axis of rotation, each cam member having a cam surface operably engaged with a corresponding cam follower assembly for generating a displacement waveform with a constant velocity portion, wherein the displacement waveforms of each cam follower assembly are offset in phase with respect to one another;
- at least two ratio control assemblies, one ratio control assembly associated with each cam member, each ratio control assembly selectively controlling an angular orientation of each corresponding cam follower assembly with respect to the cam surface, the rotatable ratio control assembly restraining the corresponding cam follower assembly for reciprocal linear movement, each ratio control assembly adjustable about an axis of rotation for scaling the reciprocal linear movement in response to an angular orientation of the ratio control assembly;
- a linkage rigidly connecting each of the at least two ratio control members to one another for synchronized movement;
- an actuator operably engaged with one of the at least two ratio control assemblies for adjusting the ratio control members through at least 90° of angular movement about the axis of rotation; and
- at least two combiners, one combiner for each cam member for converting scaled reciprocal linear movement into a continuously variable, constant velocity, rotary output about an output axis of rotation.

11. The continuously variable transmission of claim 10, wherein each ratio control assembly includes a slot for receiving at least a portion of the corresponding cam follower assembly therein.

12. The continuously variable transmission of claim 10, wherein each cam member is a hollow cam member defining an inner annulus cam surface sized and shaped to receive at least a portion of the corresponding cam follower assembly therein.

13. The continuously variable transmission of claim 10, wherein each combiner further comprises:
- a slide block adjacent to a corresponding ratio control assembly for transforming the displacement waveform from a polar force vector into Cartesian coordinate force vectors, the slide block operably engaging a portion of the cam follower assembly for linear motion in one Cartesian coordinate direction while creating lost motion in a perpendicular Cartesian coordinate direction.

14. The continuously variable transmission of claim 13 further comprising:
- a common output shaft shared by each combiner;
- each combiner including a double sided rack connected for synchronized movement with a corresponding slide block, the double sided rack interposed between a first pinion having an operable clutch engageable with the common output shaft and a second pinion having an operable clutch engageable with a transfer shaft, wherein the transfer shaft is engaged during a first directional stroke of the rack and the common output shaft is engaged during a second directional stroke of the rack, first and second intermediate gears, the first intermediate gear connected to the common output shaft and the second intermediate gear connected to the transfer shaft, and a transfer gear operably engaging the first and second intermediate gears for transferring rotary motion from the transfer shaft to the common output shaft, such that the linear reciprocal motion of the rack is converted into a common rotary motion in both reciprocal directions.

15. The continuously variable transmission of claim 10, wherein the reciprocal linear movement of the cam follower assembly is scalable between 0% and 100% inclusive in response to an angular orientation of the corresponding ratio control assembly.

* * * * *